(12) United States Patent
Pfaller et al.

(10) Patent No.: US 11,732,746 B2
(45) Date of Patent: Aug. 22, 2023

(54) DRIVE SHAFT WITH AN INTEGRATED FLANGE

(71) Applicant: AIRBUS HELICOPTERS DEUTSCHLAND GMBH, Donauworth (DE)

(72) Inventors: Rupert Pfaller, Riemerling (DE); Moritz Buesing, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 28 days.

(21) Appl. No.: 17/445,321

(22) Filed: Aug. 18, 2021

(65) Prior Publication Data

US 2022/0154762 A1 May 19, 2022

(30) Foreign Application Priority Data

Nov. 19, 2020 (EP) ..................................... 20400020

(51) Int. Cl.
*F16C 3/02* (2006.01)
*B64C 27/12* (2006.01)
*F16D 3/78* (2006.01)

(52) U.S. Cl.
CPC .............. *F16C 3/026* (2013.01); *B64C 27/12* (2013.01); *F16D 3/78* (2013.01); *F16C 2208/02* (2013.01); *F16C 2208/04* (2013.01); *F16C 2326/43* (2013.01)

(58) Field of Classification Search
CPC .. F16C 3/026; F16C 2208/02; F16C 2208/04; F16C 2326/43; B64C 27/12; F16D 3/78

USPC ............................................... 464/83, 85, 96
See application file for complete search history.

(56) References Cited

U.S. PATENT DOCUMENTS

| | | | |
|---|---|---|---|
| 3,651,661 A | 3/1972 | Darrow | |
| 4,540,385 A | 9/1985 | Krude | |
| 4,774,043 A | 9/1988 | Beckmann | |
| 4,913,266 A * | 4/1990 | Russell | ................. F16D 65/123 464/99 |
| 5,685,933 A | 11/1997 | Ohta et al. | |

(Continued)

FOREIGN PATENT DOCUMENTS

| | | | | |
|---|---|---|---|---|
| DE | 733 583 | * | 3/1943 | ...................... 464/83 |
| DE | 3517681 A1 | | 11/1986 | |

(Continued)

OTHER PUBLICATIONS

European Search Report for European Application No. EP 20400020.2, Completed by the European Patent Office, dated May 6, 2021, 9 pages.

*Primary Examiner* — Greg Binda
(74) *Attorney, Agent, or Firm* — Brooks Kushman P.C.

(57) ABSTRACT

A drive shaft made from composite materials that comprises a hollow body and a flange that is integrally formed with the hollow body. The hollow body is adapted to rotating around an associated rotation axis and is made of a first composite material. The flange is made of a second composite material and arranged at an axial end of the hollow body. The flange comprises at least two separate plates that branch out from the hollow body at the axial end. The flange further comprises a mounting section that is configured to be mounted to an external component and comprises a plurality of holes that is adapted to accommodate coupling means.

18 Claims, 18 Drawing Sheets

(56) References Cited

U.S. PATENT DOCUMENTS

| | | | |
|---|---|---|---|
| 5,724,715 A | 3/1998 | Byerly et al. | |
| 8,029,371 B2 * | 10/2011 | Stamps | B64C 27/32 464/85 |
| 9,937,671 B2 | 4/2018 | Larson | |
| 2012/0270006 A1 | 10/2012 | McMillan | |
| 2016/0281540 A1 | 9/2016 | Kirkpatrick et al. | |
| 2019/0128317 A1 | 5/2019 | Giannakopoulos | |

FOREIGN PATENT DOCUMENTS

| | | | | |
|---|---|---|---|---|
| DE | 4414384 C2 | 10/1994 | | |
| DE | 102015225180 A1 | 6/2017 | | |
| EP | 0413677 A1 | 2/1991 | | |
| EP | 3332946 A1 | 6/2018 | | |
| FR | 2564538 B1 | 11/1985 | | |
| GB | 2 172 676 A | * | 9/1986 | 188/218 XL |
| JP | 4227299 B2 | 2/2009 | | |
| WO | 2017117497 A1 | 7/2017 | | |

\* cited by examiner

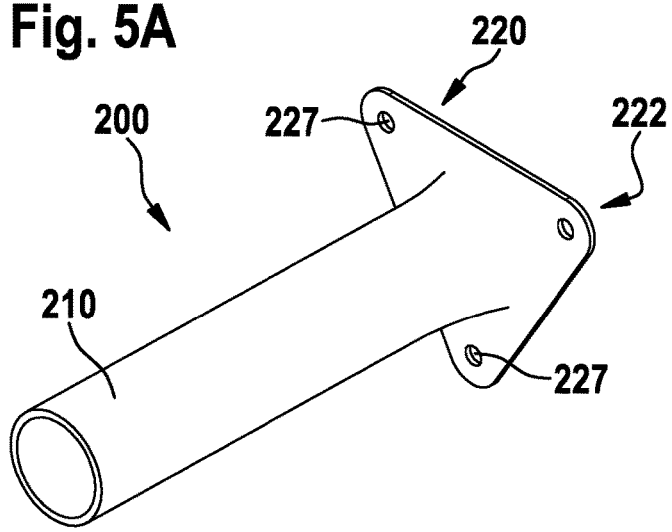
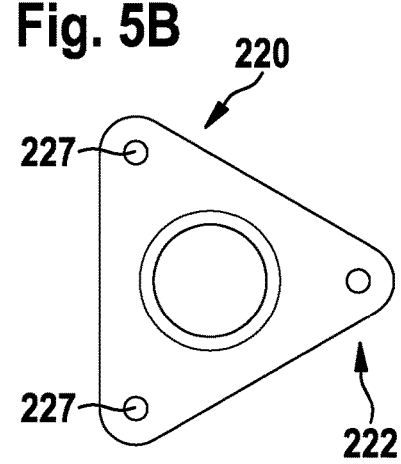
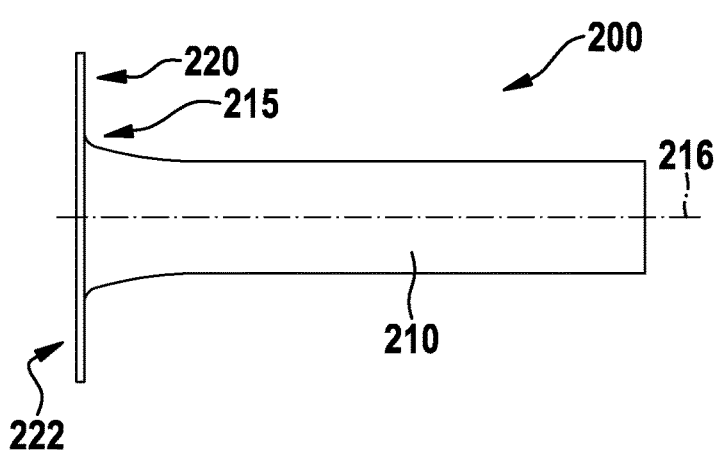
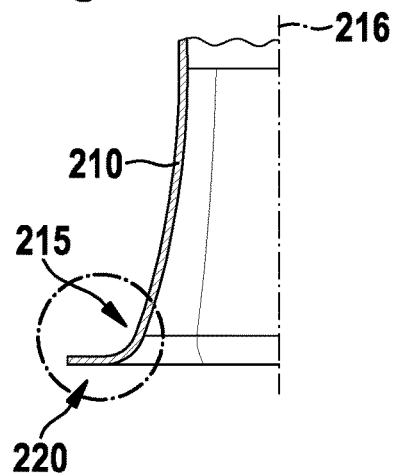
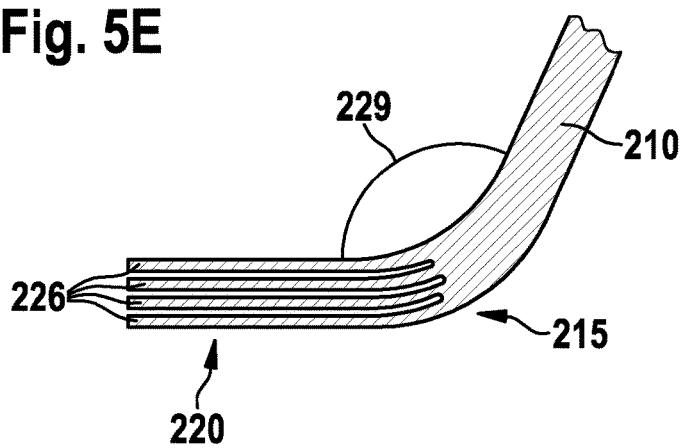

A-A

DRIVE SHAFT WITH AN INTEGRATED FLANGE

CROSS-REFERENCE TO RELATED APPLICATIONS

This application claims priority to European patent application No. EP 20400020.2 filed on Nov. 19, 2020, the disclosure of which is incorporated in its entirety by reference herein.

TECHNICAL FIELD

The present embodiments are related to a drive shaft, and, more particularly, to a drive shaft made from composite materials that comprises an integrated flange arranged in layers.

BACKGROUND

Conventionally, a drive shaft rotates around an associated rotation axis and transmits thereby mechanical torque to other devices that are coupled to the drive shaft. The coupling between the drive shaft and the other devices usually involves the use of a flange that is firmly attached to the drive shaft.

Traditionally, such flanges have been fabricated from metals, because of the ability to simply manufacture and connect metal flanges with metal drive shafts. Moreover, metallic flanges in combination with special couplings that are attached to the end of a drive shaft may be able to cover at least some angular and axial tolerances.

However, in recent years, the use of drive shafts made from composite materials has steadily increased, and flanges made from metals cannot be easily connected to drive shafts made from composite materials. In fact, usually, metallic flanges are connected to a drive shaft by gluing, clamping, screwing and/or joining by forming. Moreover, connecting a metallic flange to a drive shaft made from composite material can cause corrosion and earlier stress fractures on the connection area.

Therefore, flanges made from composite materials have been considered for use with drive shafts made from composite materials. However, compared to metal flanges, flanges made from composite materials have historically suffered from relatively low strength. Recent improvements on flanges made from composite materials have overcome these drawbacks.

Document U.S. Pat. No. 5,724,715 A describes a composite flange that provides the low cost and bonding capability of molded flanges with the torque capacity near that of metal flanges. Multiple layers of braided fiberglass enveloping a fiberglass ring are placed into a mold of the desired shape. After the mold is closed, liquid resin is injected and the flange is cured to the desired state. After demolding, the flange is machined as necessary for installation onto the drive shaft.

However, the connections between the drive shaft and the flange are often a weak spot for the safety of the whole drive system, especially for critical applications such as aircraft or spacecraft whose thrust producing units include such drive systems. Furthermore, relying on flanges that are manufactured separately from the associated drive shaft involves the use of more parts, which is usually more cost intensive in the production, in the quality management, and in the part inventory management.

Therefore, recent drive systems form a flange and a drive shaft as an integral part out of a composite material.

Document JP 4227299 B2 describes a method for manufacturing a flanged tubular product made of fiber reinforced plastic. The flanged tubular product maintains a continuity of the reinforcing fiber between the tubular portion and the flange portion to ensure a certain strength at the connection portion between the tubular and the flange portions. Further, since the flange portion is formed by stretching, the inside of the flange portion is thick and the outside is thin, which is advantageous in increasing the strength of the flange root where stress is concentrated. The reinforcing fibers of the flange portion are arranged in the radial direction, the density thereof is uniform in the circumferential direction, and it is possible to obtain isotropy in terms of strength and dimensions.

Document DE 44 14 384 C2 describes a method of making a fiber reinforced resin drive shaft with a shaft and flanges formed thereon as a unitary body. The shaft is formed by winding a resinous thread on a mandrel provided with pins on its circumferential surface, the thread being hooked onto the pins. The thread is then wrapped circumferentially to form a tire-like reinforcement tape near each end of the shaft. After the pins and end pieces of the mandrel are removed, each end portion of the shaft is expanded by a forming tool to form a flange. After hot hardening, the remaining part of the mandrel is also removed.

Document EP 0413677 A1 describes an intermediate member for mounting in a torque-transmitting drive connection. The intermediate member has a tubular center part and end connecting parts. In order to achieve a good silencing effect with a simple construction, the center and connecting parts form an integral fiber-reinforced plastic body, whose fibers run approximately along the tension and compression stress lines which occur when a torque load is applied, passing from the outer edge to the outer edge of the connecting parts.

Document U.S. Pat. No. 4,774,043 A describes a method for producing a hollow fiber-reinforced plastic shaft having a center axis and regions having different diameters which are rotationally symmetric, the method comprising: providing a core having a center axis and a plurality of regions having different diameters which are rotationally symmetric; mounting over the core at least one braided fiber tube having an initial braiding angle such that the tube fibers form an angle of 20°-40° with respect to the center axis of the shaft in regions of the shaft having a smallest diameter, or form an angle of approximately 45° with respect to the center axis of the shaft in regions of the shaft having a largest diameter; impregnating the at least one braided fiber tube with a settable plastic for setting the tube; and setting the plastic while the tube is held in fixed position on the different diameter regions of the core to provide a molded shaft having regions with different diameters.

Document DE 35 17 681 A1 describes an articulated shaft with flexible shaft joints which consist of disc- or cone-shaped diaphragms which are flexible as regards angular and axial deformations and stiff with regard to torsional and radial deformations. The diaphragms are reinforced against local instabilities (shear bulges) by profiles on the (thin) diaphragms, the profiles preferably being arranged in a ring around the center and preferably being wave-shaped in their cross-section. This shaping furthermore provides additional elasticity for the desired mobility. The diaphragm is preferably manufactured from fiber-reinforced plastic in laminate form and preferably in one piece with an associated shaft section (likewise composed of fiber-reinforced plastic), giving one-piece articulated shafts.

Document FR 2564538 B1 describes a rotary transmission shaft whose body comprises crossed webs or layers of fibers of high modulus, the fibers of these webs making an angle lying substantially between 40° and 50° with the axis of the tube and optionally, so as to increase the axial rigidity, at least one web or layer of fibers parallel to the said axis. This shaft comprises, in the vicinity of each of its ends, at least one undulated portion in the form of bellows whose flanks are coated with webs of fibers of low modulus, the fibers of these auxiliary webs making an angle of less than 20° with the axis of the tube.

Document U.S. Pat. No. 4,540,385 A describes a drive shaft assembly particularly for use in driving the wheels of a motor vehicle having a first universal joint and a second universal joint with an intermediate shaft interconnecting the two joints, the intermediate shaft being made of fiber reinforced plastic material and being formed integrally with a component of at least one of the universal joints.

However, most current solutions that are based on integrally formed drive shaft and flange lack strength and/or the flexibility to cover angular and/or axial tolerances that such a drive system requires.

SUMMARY

Based on the limitations and drawbacks of the prior art, an objective is to provide a drive shaft with an integrated flange that has an increased flexibility to allow for angular and axial tolerances. This objective is solved by a drive shaft comprising a flange and a hollow body with an associated rotation axis. The hollow body is adapted to rotating around the rotation axis and made of a first composite material. The flange is made of a second composite material and arranged at an axial end of the hollow body, wherein the flange is integrally formed with the hollow body and comprises at least two separate plates that branch out from the hollow body at the axial end and extend at least partially with a predetermined angle relative to the rotation axis, wherein the at least two separate plates form at least a first and a second plate assembly, wherein the first plate assembly branches out from the hollow body in a first direction that is perpendicular to the rotation axis, and wherein the second plate assembly branches out from the hollow body in a second direction that is perpendicular to the rotation axis and different that the first direction, and a mounting section that is configured to be mounted to an external component and comprises a plurality of holes that is adapted to accommodate coupling means, wherein at least one hole of the plurality of holes traverses the at least two separate plates.

The flange is integrated with the drive shaft. The drive shaft may have flanges on one or both ends. The flanges at one or both ends of the drive shaft are separated into plates.

Additionally, due to the splitting of the ends into plates, the ends of the drive shaft can be reinforced by increasing the thickness and/or by adjusting the lay-up of the fibers to the load condition of each area, e.g., bearing loads at the connecting holes of the flange.

Thus, the number of parts of a drive system that includes a drive shaft and a flange may be reduced due to the integrated function of drive shaft and flange. Thereby, the associated costs for the production, the quality management, and the part inventory management may be reduced.

Furthermore, any structural weak spots due to stress concentrations and/or galvanic corrosion. at the interface between the drive shaft made from composite material and a state-of-the-art flange may be eliminated.

According to one aspect, the first and second composite materials are identical.

According to one aspect, the first and second composite materials are different.

According to one aspect, the second composite material comprises at least one of carbon fiber, aramid fiber, basalt fiber, mineral fiber, or glass fiber.

According to one aspect, the at least two separate plates extend at least partially in a direction that is parallel to the rotation axis.

According to one aspect, at least one of the at least two separate plates comprises a reinforcement around the at least one hole of the plurality of holes.

According to one aspect, the reinforcement comprises at least one of a shim, a washer, or an increased thickness of the second composite material around the at least one hole of the plurality of holes.

According to one aspect, the at least two separate plates further comprise at least first and second cut-outs with identical cross section shapes. In this context, having "identical" cross section shapes means that the at least first and second cut-outs may have cross section shapes that differ from each other by not more than predetermined manufacturing tolerances.

According to one aspect, the at least two separate plates further comprise at least first and second cut-outs with different cross section shapes.

According to one aspect, the cross section shapes are asymmetrical.

According to one aspect, the at least two separate plates branch out from the hollow body in at least two concentric shells around the rotation axis, wherein the at least two concentric shells have a first inner diameter at a first distance from the axial end and a second inner diameter at a second distance from the axial end, wherein the first and second inner diameters are different.

According to one aspect, the hollow body has a wall thickness at the axial end that is greater than a mean wall thickness of the hollow body.

Moreover, a rotary-wing aircraft may include the drive shaft as described above.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

FIG. 5A is a three-dimensional diagram of an illustrative drive shaft with an integrated triangular flange that extends at a predetermined angle from the rotation axis of the drive shaft in accordance with some embodiments, FIG. 5B is a diagram of the illustrative drive shaft of FIG. 5A seen in direction of the associated rotation axis in accordance with some embodiments, FIG. 5C is a diagram of the illustrative drive shaft of FIG. 5A seen in a direction that is perpendicular to the associated rotation axis in accordance with some embodiments, FIG. 5D is a diagram of an illustrative partial cross section of the drive shaft of FIG. 5A in accordance with some embodiments, FIG. 5E is a diagram of an illustrative portion of the partial cross section of the drive shaft of FIG. 5D in accordance with some embodiments.

DETAILED DESCRIPTION

Exemplary embodiments may be used with any devices or vehicles with a drive shaft in which the drive shaft rotates around an associated rotation axis and transmits thereby mechanical torque to other devices that are coupled to the drive shaft, whereby the coupling between the drive shaft and the other devices involves the use of a flange that is integrally formed with the drive shaft. Examples for devices may include wind turbines, transmission of forces from a motor, transmissions of forces from/to rotors, dynamometers, etc. Examples for vehicles may include aircraft such as airplanes, quadcopters, helicopters, and drones, land-based vehicles including cars, buses, trucks, and motorcycles, or vessels such as ships and boats, etc.

Figure 1:
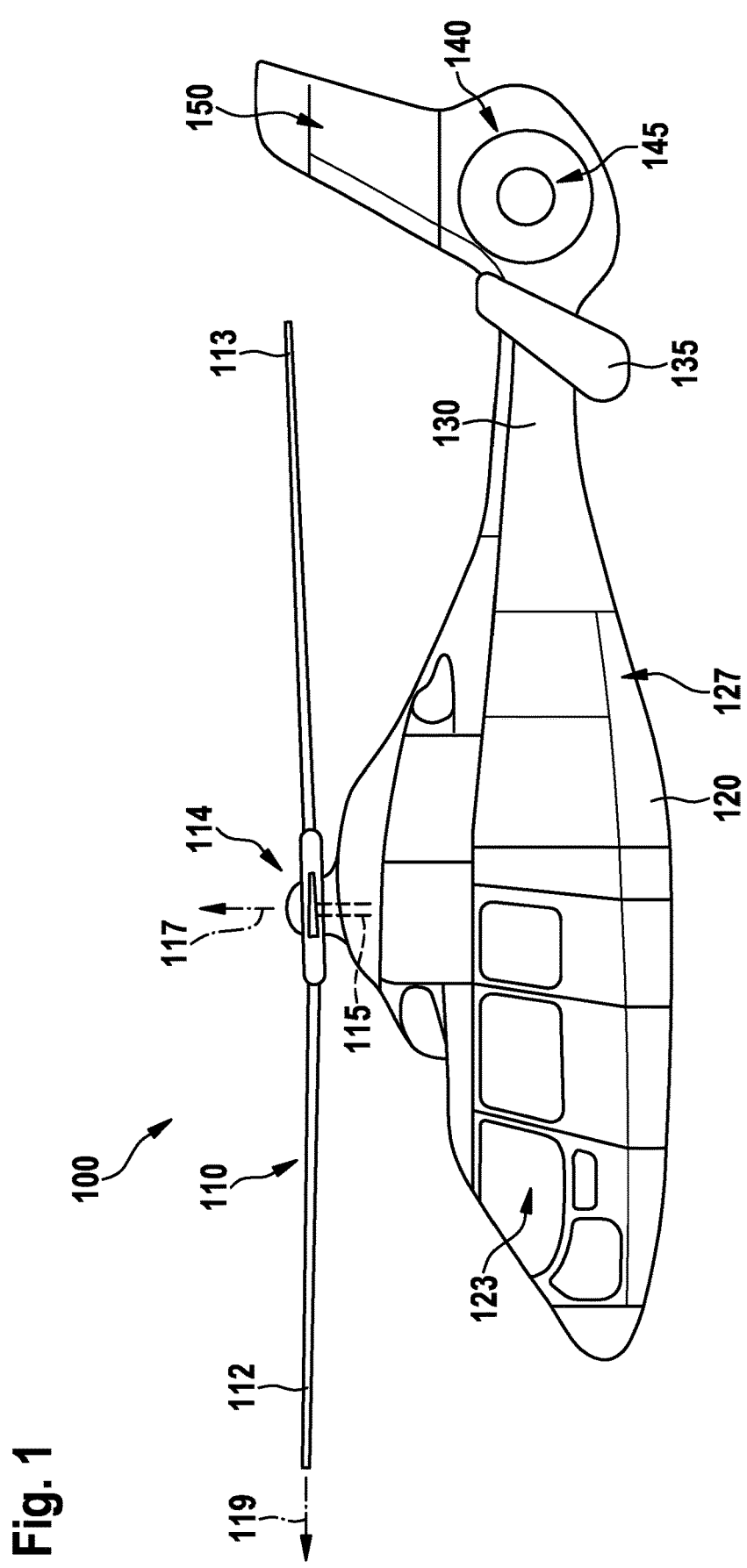
FIG. 1 is a diagram of an illustrative rotary-wing aircraft with an illustrative drive shaft in accordance with some embodiments.

FIG. 1 is a diagram of an illustrative aircraft that is embodied as a rotary-wing aircraft 100 having at least one rotor 110 with a rotor shaft 115. As shown in FIG. 1, the rotary-wing aircraft 100, which is sometimes also referred to as rotorcraft 100, is exemplarily illustrated as a helicopter. Thus, for purposes of simplicity and clarity, the rotorcraft 100 is hereinafter referred to as the "helicopter" 100.

Illustratively, helicopter 100 may have a fuselage 120 that forms an airframe of the helicopter 100. The fuselage 120 is connected to a suitable landing gear and exemplarily forms a cabin 123 and a rear fuselage 127. The rear fuselage 127 is connected to a tail boom 130.

By way of example, helicopter 100 may include at least one counter-torque device 140 configured to provide counter-torque during operation, i.e., to counter the torque created by rotation of the at least one rotor 110 for purposes of balancing the helicopter 100 in terms of yaw. If desired, counter-torque device 140 may be shrouded. The at least one counter-torque device 140 is illustratively provided at an aft section of the tail boom 130 and may have a tail rotor 145. The aft section of the tail boom 130 may include a fin 150. Illustratively, the tail boom 130 may be provided with a suitable horizontal stabilizer 135.

Illustratively, helicopter 100 may have at least one rotor 110, which is illustratively provided as a multi-blade rotor 110, for providing lift and forward or backward thrust during operation. The at least one multi-blade rotor 110 comprises a plurality of rotor blades 112, 113 that are mounted at an associated rotor head 114 to a rotor shaft 115, which rotates in operation of the helicopter 100 around an associated rotor axis 117 in a rotor plane 119.

The rotor shaft 115 may have first and second ends. Rotor head 114 with rotor blades 112, 113 may be attached to the first end of the rotor shaft 115. The second end of the rotor shaft 115 may be installed within a gearbox.

If desired, the rotor shaft 115 may include a drive shaft with flanges at the first and/or the second end. For example, one of the illustrative drive shafts 200 shown in FIGS. 2A to 11D may implement at least a portion of rotor shaft 115 of helicopter 100. In other words, helicopter 100 may include a drive shaft 200 as described below with reference to FIGS. 2A to 11D.

Figure 2A:
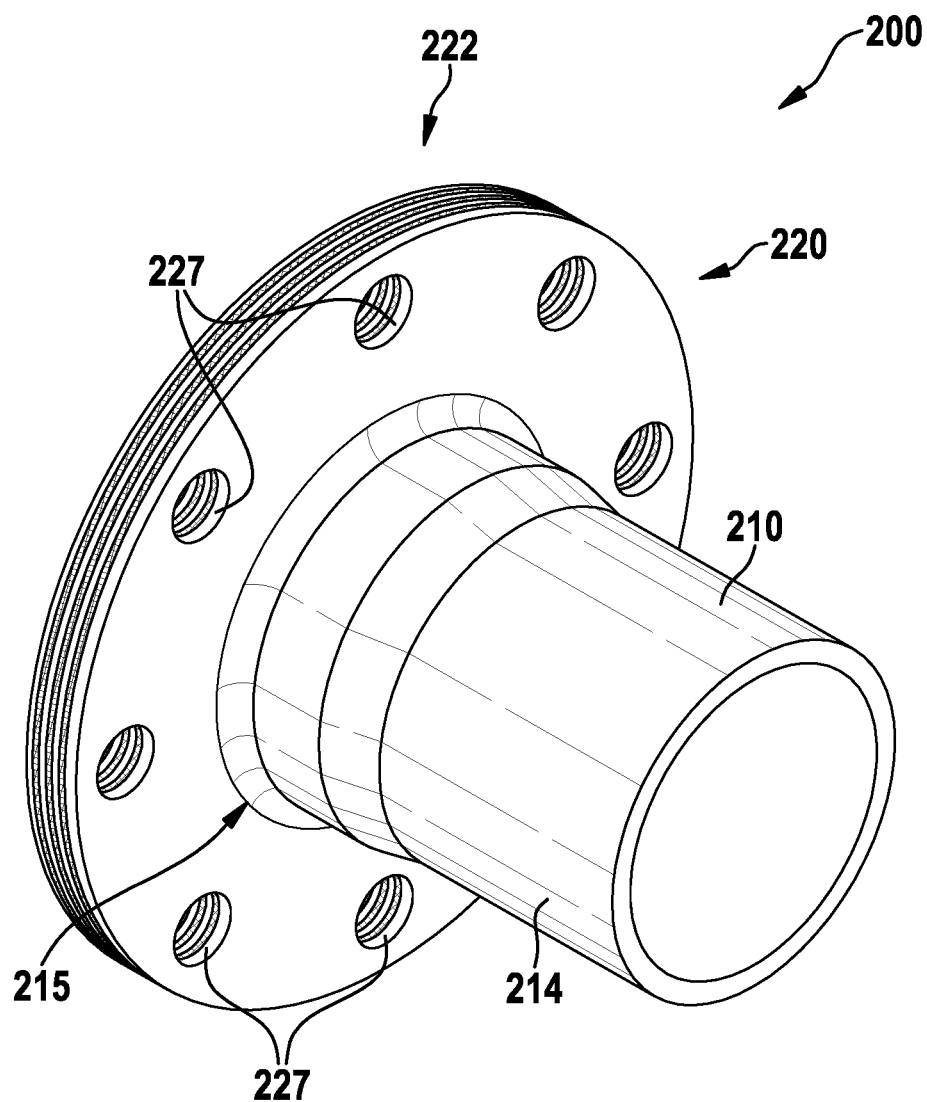
FIG. 2A is a three-dimensional diagram of an illustrative drive shaft with an integrated flange that extends at a predetermined angle from the rotation axis of the drive shaft in accordance with some embodiments.
Figure 2B:
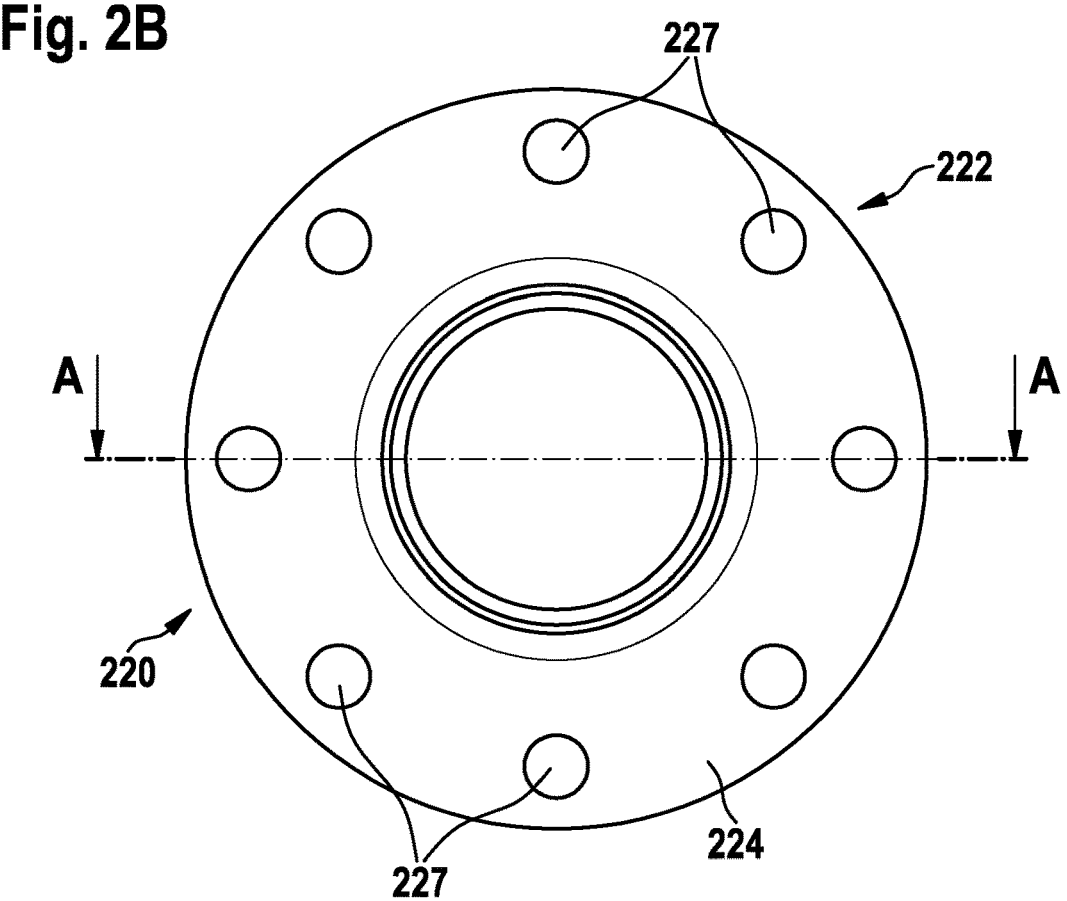
FIG. 2B is a diagram of the illustrative drive shaft of FIG. 2A seen in direction of the associated rotation axis in accordance with some embodiments.
Figure 2C:
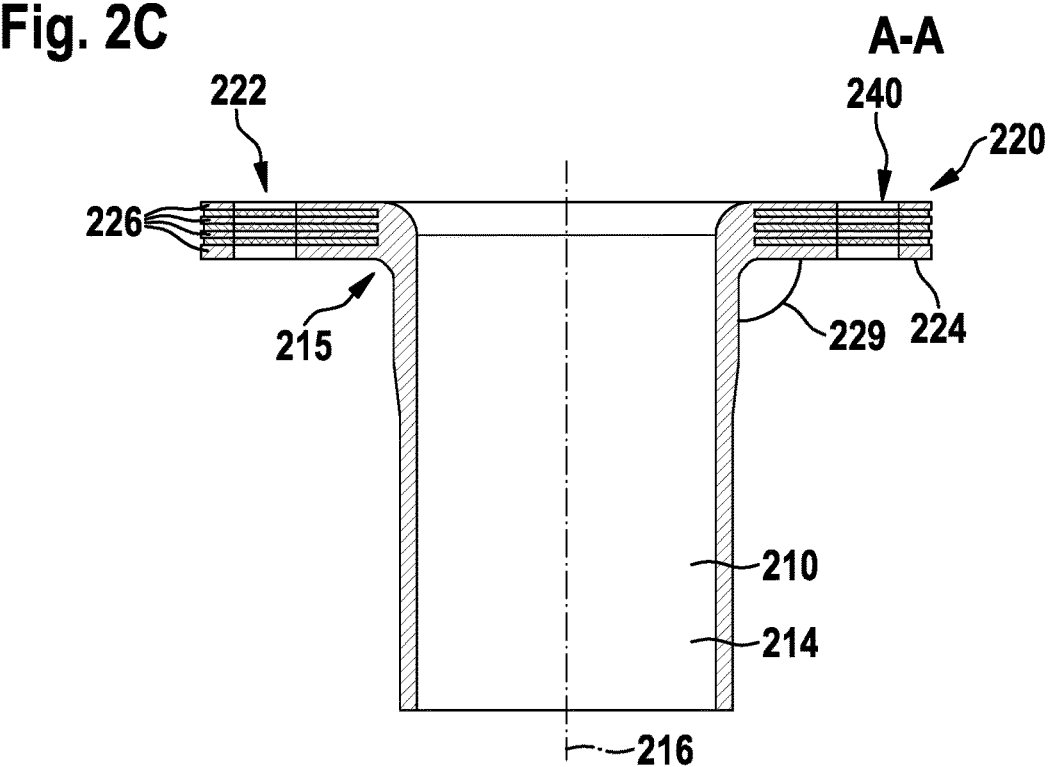
FIG. 2C is a diagram of an illustrative cross section of the drive shaft of FIG. 2A in accordance with some embodiments.

FIG. 2A, FIG. 2B, and FIG. 2C describe a same drive shaft 200 for a drive system comprising a hollow body 210 and a flange 220 and are commonly described hereinafter. FIG. 2A is a three-dimensional diagram of the illustrative drive shaft 200, FIG. 2B is a diagram of the illustrative drive shaft 200 of FIG. 2A seen in direction of the associated rotation axis 216, and FIG. 2C is a diagram of an illustrative cross section of the drive shaft 200 of FIG. 2A in accordance with some embodiments.

As shown in FIGS. 2A to 2C, drive shaft 200 comprises a hollow body 210. Illustratively, hollow body 210 may have a sleeve or tube shape. Hollow body 210 may have a circular cross section shape, a polygonal cross section shape, an oval cross section shape, or an elliptical cross section shape. If desired, hollow body 210 may have a circular cross section shape, a polygonal cross section shape, an oval cross section shape, and/or an elliptical cross section shape in at least some sections.

As an example, the hollow body 210 may have a circular cross section shape in a first section and a polygonal cross section shape in a second section. As another example, the hollow body 210 may have an oval cross section shape in a first section, a polygonal cross section shape in a second section, and a circular cross section shape in a third section.

The hollow body 210 has an associated rotation axis 216. The rotation axis 216 of the hollow body 210 coincides with the rotation axis 216 of the drive shaft 200. Therefore, the terms rotation axis 216 of the drive shaft 200 and rotation axis 216 of the hollow body are used interchangeably hereinafter. The hollow body 210 is adapted to rotating around the rotation axis 216 and is made of a first composite material 214.

Drive shaft 200 further comprises a flange 220 that is made of a second composite material 224. Illustratively, the second composite material 224 comprises at least one of carbon fiber, aramid fiber, basalt fiber, mineral fiber, or glass fiber.

The first and second composite materials 214, 224 may be identical. If desired, the first and second composite materials 214, 224 may be different. For example, the hollow body 210 may be made from a first composite material 214 that includes comparably stiff carbon fibers, while the flange 220 may be made from a second composite material that includes comparably less stiff fibers such as glass fibers.

Flange 220 is arranged at an axial end 215 of the hollow body 210, and flange 220 is integrally formed with the hollow body 210. For example, flange 220 may be formed together with the hollow body 210 during manufacturing of the drive shaft 200.

Flange 220 comprises at least two separate plates 226. Illustratively, flange 220 is shown to have four separate plates 226. However, flange 220 may have two, three, five, six, seven, or more separate plates 226, if desired.

The drive shaft 200 with the integrally formed hollow body 210 and flange 220 may be assembled as a composite tube with at least one flared or contracted end from pre-impregnated (pre-preg) layers or rovings, separating layers and/or wet laminate layers or rovings before curing.

As an example, the separating layers may include release agents or layers that adhere poorly to the used resin system such as thermoplastic layers in an epoxy system, Polytetrafluoroethylene (PTFE) layers, PTFE-coated materials, etc. As another example, the separating layers may include layers that degrade quickly, layers that can be removed with a solvent or reagent, layers that can be removed by applying heat, or elastic layers with comparatively low stiffness that can be included in the laminate of the end of the tube.

Illustratively, the layers may be draped and rovings may be woven and wrapped. The laminate may then be formed by adding layers or rovings or using tape laying or patch laying methods before curing and machining. If desired, the separation of the at least two separate plates 226 may be applied via machining or splitting after the drive shaft 200 is cured instead of using separating layers.

Instead of using pre-preg layers or wet laminate layers, a dry laminate including separating layers may be assembled to a shape that is close to the shape of the drive shaft 200 using state-of-the-art methods. In further manufacturing steps, resin may be injected or applied to the dry laminate, which is then cured and machined.

The at least two separate plates 226 branch out from the hollow body 210 at the axial end 215. By way of example, the at least two separate plates 226 may extend at least partially with a predetermined angle 229 relative to the rotation axis 216. As shown in FIG. 2C, the at least two separate plates 226 extend away from the rotation axis 216 at a 90° angle relative to the rotation axis 216.

Illustratively, each one of the at least two separate plates 226 may be thinner than the wall of the hollow body 210. If desired, the sum of the thicknesses of all plates of the at least two separate plates 226 may be thicker than the wall of the hollow body 210.

Preferably, the ratio between the extension of the at least two separate plates 226 at the predetermined angle 229 relative to the rotation axis 216 (i.e., the length and width of flange 220) and the thickness of each one of the at least two separate plates 226 is high to provide for a sufficient bending of the at least two separate plates 226 in a direction that is parallel to the rotation axis 216.

Thus, the flange 220 of drive shaft 200 of FIGS. 2A to 2C may be flexible in bending in a direction that is parallel to rotation axis 216. Thereby, the drive shaft 200 may compensate for tolerances in direction of the rotation axis 216 during mounting of the drive shaft 200.

The flange 220 may be able to transfer shear and bending moments in direction of the predetermined angle 229 relative to the rotation axis 216 (i.e., in length and width direction of flange 220). If desired, the strength of the flange 220 may be adjusted by varying the number of separate plates 226 and/or the thickness of each one of the at least two separate plates 226.

Flange 220 also comprises a mounting section 222 that is configured to be mounted to an external component (e.g., rotor head 114 of FIG. 1). Mounting section 222 comprises a plurality of holes 227 that is adapted to accommodate coupling means.

Coupling means may include any suitable fastener that firmly attach flange 220 to the external component. For example, the coupling means may include at least one of a rivet, a screw, a nut and bolt, or a pin.

At least one hole of the plurality of holes 227 traverses the at least two separate plates 226. As shown in FIGS. 2A to 2C, all holes of the plurality of holes 227 traverse all plates of the at least two separate plates 226.

If desired, at least one of the at least two separate plates 226 may include a reinforcement 240 around the at least one hole of the plurality of holes 227. As shown in FIG. 2C, at least two holes of the plurality of holes 227 have reinforcements 240.

Reinforcements 240 around the plurality of holes 227 may result in higher bearing loads around the hole area. Preferably, the flange 220 may include support areas between the separate plates 226 around each hole of the plurality of holes 227. These support areas may avoid bending of the separate plates 226 when the separate plates 226 are clamped by bolts that extend through the holes 227.

Illustratively, the reinforcement 240 may include at least one of a shim, a washer, or an increased thickness of the second composite material 224 around the at least one hole of the plurality of holes 227.

Illustratively, the flange may include different plate assemblies that are all connected to the drive shaft, but disconnected from each other.

Figure 3A:
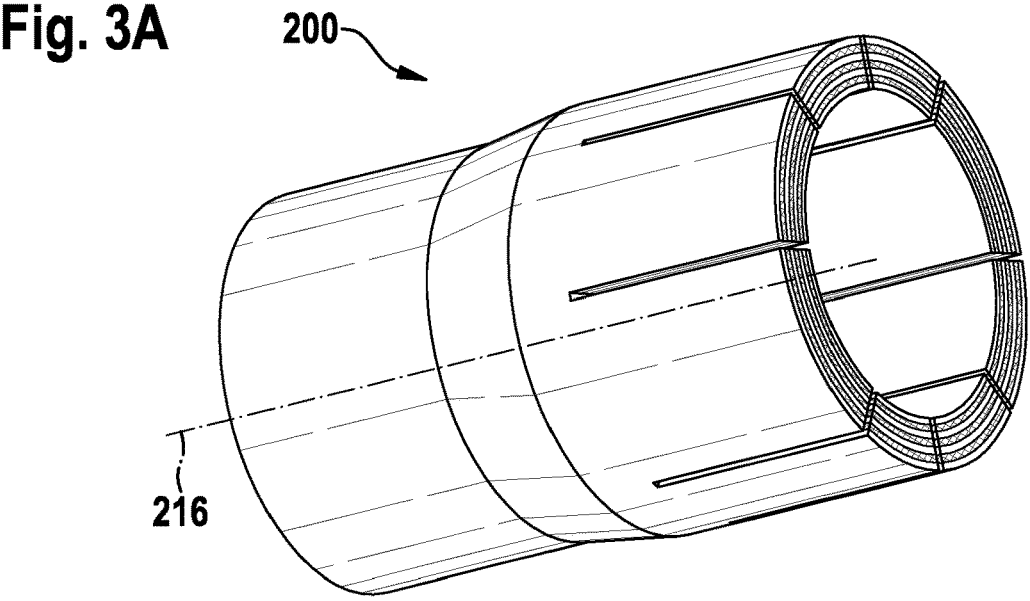
FIG. 3A is a three-dimensional diagram of an illustrative drive shaft with notches that form an integrated flange before the bending of the flange portion in accordance with some embodiments.
Figure 3B:
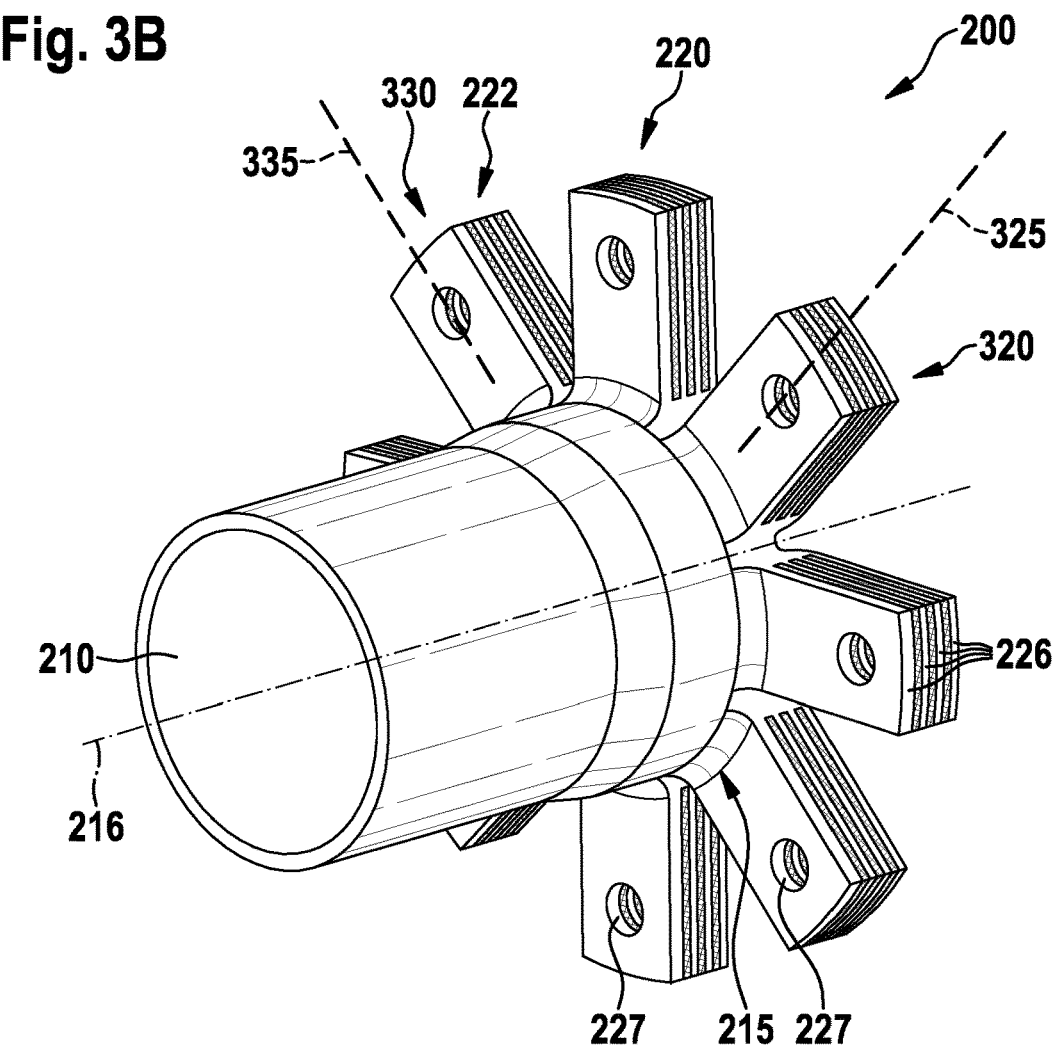
FIG. 3B is a three-dimensional diagram of the illustrative drive shaft of FIG. 3A after the bending and perforation of the flange portion in accordance with some embodiments.

FIG. 3A and FIG. 3B describe a same drive shaft 200 for a drive system comprising a hollow body 210 with an associated rotation axis 216 and a flange 220 and are commonly described hereinafter. FIG. 3A is a three-dimensional diagram of the illustrative drive shaft 200 with notches that form an integrated flange 220 before the bending of the flange portion, while FIG. 3B is a three-dimensional diagram of the illustrative drive shaft 200 of FIG. 3A after the bending and perforation of the flange 220 in accordance with some embodiments.

By way of example, the hollow body 210 and the flange 220 are integrally formed as one shaft, whereby the flange 220 includes at least two separate plates 226. The shaft may then be cut with straight cuts parallel to the rotation axis 216 into separate sections at the flange end (i.e., at the end with the at least two separate plates 226), and the so produced separate sections may form plate assemblies 320, 330.

For example, drive shaft 200 may be manufactured as a composite tube that is fully assembled before curing using state-of-the-art methods such as draping layers, wrapping layers, weaving and wrapping rovings, tapelaying, patch placement, etc. During assembly, separating layers may be installed at the end of the composite tube. These separating layers may be release agents, layers that adhere poorly to the used resin system, layers that degrade quickly, layers that can be removed with a solvent or reagent, layers that can be removed by applying heat, or elastic layers with comparatively low stiffness. The separating layers enable the manufacturing of the at least two separate plates 226.

Figure 4A:
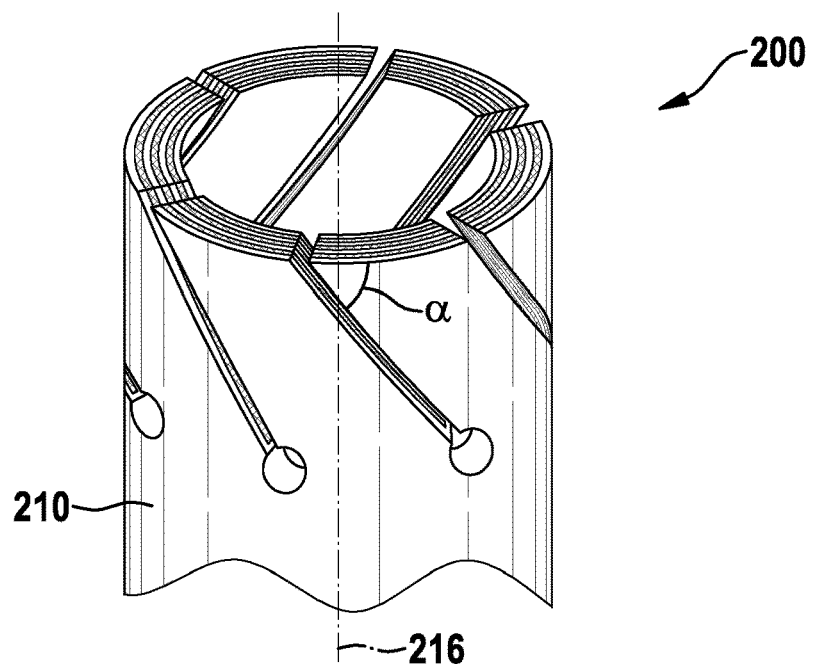
FIG. 4A is a three-dimensional diagram of an illustrative drive shaft with notches at a predetermined angle relative to the rotation axis of the drive shaft, whereby the notches form an integrated flange before the bending of the flange portion in accordance with some embodiments.

Lengthwise cuts may be applied at the end of the composite tube. Alternatively, the cuts can be placed at an angle α relative to the cross section of the composite tube as shown in FIG. 4A (i.e., relative to a plane with a normal vector that is parallel to the rotation axis 216). The angle may be in the range of 25°<α<155°. Applying cuts at an angle that is non-parallel to rotation axis 216 (i.e., at an angle α that is different than 90°) may avoid cutting some of the load bearing fibers for transfer of torsion.

The cuts at the end of the composite tube are forming plate assemblies 320, 330 which are then bent outwards (i.e., away from the rotation axis 216). If desired, separating layers or mold shims can also be inserted after bending the plate assemblies 320, 330 outwards.

Illustratively, stress release radii can be cut at the ends of the cuts. The cuts may be slots or triangular with two edges with different angles.

The composite tube is then cured. Additional features such as holes and stress release radii may be milled or drilled after the curing operation. If desired, the separation of the plates can be also applied via machining, or splitting after the whole drive shaft is cured.

Instead of using pre-preg layers or wet laminate layers, a dry laminate including separating layers may be assembled to the shape of a tube using state-of-the-art methods. The tube may be cut several times at the angle α and the so-created plate assemblies 320, 330 are bent outwards. In further manufacturing steps, resin may be injected or applied to the dry laminate, which is then cured and machined.

Alternatively, a pre-cured thermoplastic composite tube may be cut several times at an angle α. If desired, other machining steps may be applied including cutting the stress radii at the ends of the plate assemblies 320, 330. The laminate may be heated until it is at least locally deformable to allow for the plate assemblies 320, 330 to be bent outwards. In a further operation, the machining can be finished.

Illustratively, the at least two separate plates 226 may form at least a first plate assembly 320 and a second plate assembly 330. If desired the at least two separate plates 226 may form more than two plate assemblies that branch out from the hollow body 210. As shown in FIG. 3B, the at least two separate plates 226 may form eight separate plate assemblies that branch out from the hollow body 210.

Each one of the plate assemblies may include a mounting section 222 with at least one hole 227. If desired, at least one of the first and second plate assemblies 320, 330 may include a reinforcement around the at least one hole 227.

Illustratively, the first plate assembly 320 may branch out from the hollow body 210 in a first direction 325. The second plate assembly 330 may branch out from the hollow body 210 in a second direction 335 that is different than the first direction 325.

By way of example, the first direction 325 may be perpendicular to the rotation axis 216. If desired, the second direction 335 may be perpendicular to the rotation axis 216.

Figure 4B:
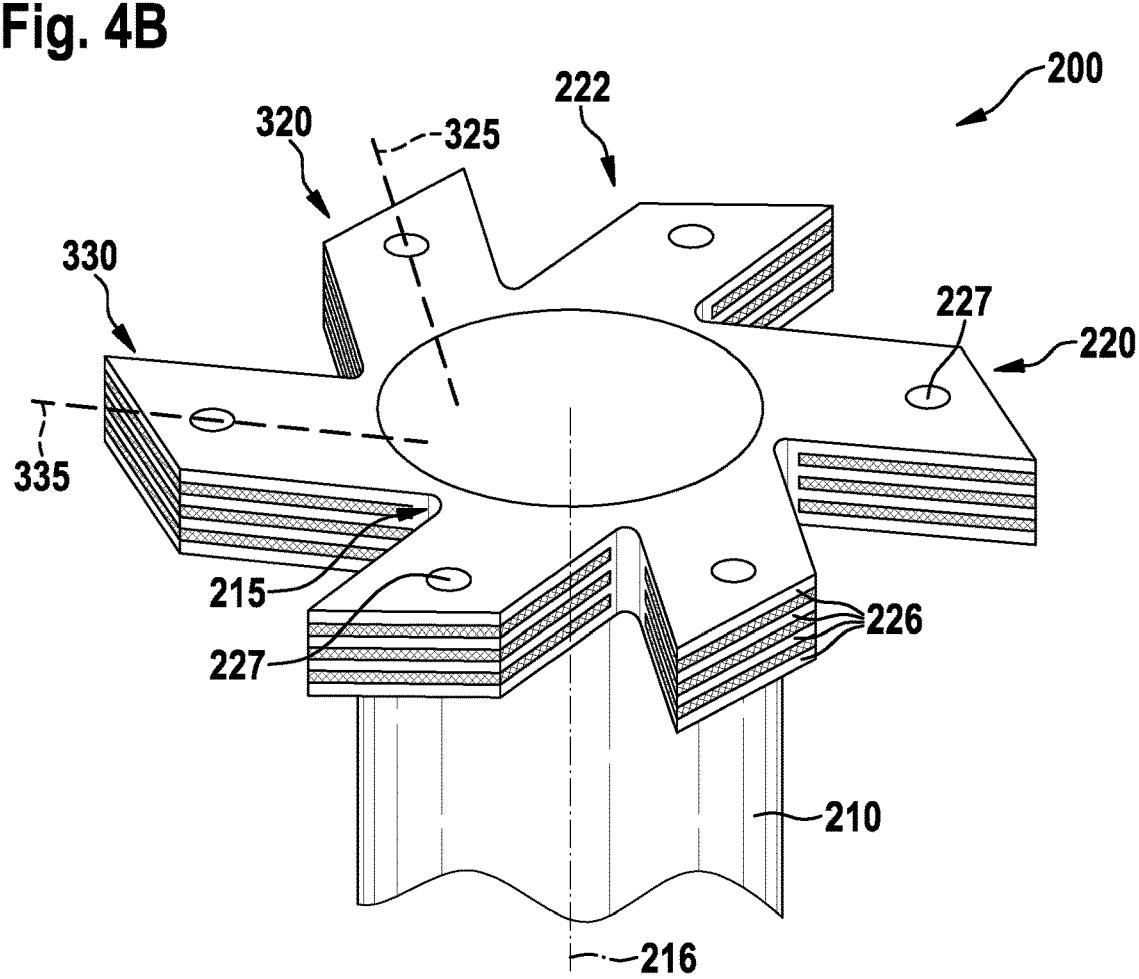
FIG. 4B is a three-dimensional diagram of the illustrative drive shaft of FIG. 4A after the bending and perforation of the flange portion in accordance with some embodiments.

FIG. 4A and FIG. 4B describe a same drive shaft 200 for a drive system comprising a hollow body 210 with an associated rotation axis 216 and a flange 220 and are commonly described hereinafter. FIG. 4A is a three-dimensional diagram of the illustrative drive shaft 200 with notches at a predetermined angle to the cross section plane of the drive shaft that form an integrated flange 220 before the bending of the flange portion, while FIG. 4B is a three-dimensional diagram of the illustrative drive shaft 200 of FIG. 4A after the bending and perforation of the flange 220 in accordance with some embodiments.

The hollow body 210 and the flange 220 are integrally formed, whereby the flange 220 includes at least two separate plates 226. The shaft may be cut at a predetermined angle relative to the rotation axis 216 into separate sections at the flange end (i.e., at the end with the at least two separate plates 226), and the so produced separate sections may form plate assemblies 320, 330.

In contrast to the drive shaft 200 of FIG. 3A and FIG. 3B, the drive shaft 200 of FIG. 4A and FIG. 4B has six fingers instead of eight fingers and a cut direction at a predetermined angle that is different than a cut direction parallel to the rotation axis 216.

Due to the cut direction at the predetermined angle, the flange 220 of FIG. 4B has a lower stiffness in a direction that is parallel to the rotation axis 216 and an increased transfer of the load in the plate assemblies 320, 330 in tension or compression (depending on the rotation direction of the drive shaft 200 around rotation axis 216) compared to the flange 220 of FIG. 3B.

For a smaller number of plate assemblies, the round shape of the hollow body 210 may be modified at the axial end 215 to enable the bending of the plate assemblies. An example with three separate plate assemblies is shown in FIGS. 5A to 5E which are commonly described hereinafter.

FIG. 5A is a three-dimensional diagram of an illustrative drive shaft 200 comprising a hollow body 210 with an integrated triangular flange 220 that extends at a predetermined angle 229 from the rotation axis 216 of the drive shaft 200. FIG. 5B is a diagram of the illustrative drive shaft of FIG. 5A seen in direction of the associated rotation axis, FIG. 5C is a diagram of the illustrative drive shaft of FIG. 5A seen in a direction that is perpendicular to the associated rotation axis, FIG. 5D is a diagram of an illustrative partial cross section of the drive shaft of FIG. 5A, and FIG. 5E is a diagram of an illustrative portion of the partial cross section of the drive shaft of FIG. 5D.

The flanges 220 of FIGS. 5A to 5D are built with the at least two separate plates 226 as shown in FIG. 5E. However, the at least two separate plates 226 are not shown in FIGS. 5A to 5D to simplify and avoid obscuring FIGS. 5A to 5D.

In the drive shaft 200 of FIGS. 5A to 5E, the flange 220 is integrated with the hollow body 210 to allow a positive mold to be removed in flange direction. This means, all geometry is added on top of the mold cylinder.

As shown in FIGS. 5A and 5B, the flange 220 may have the shape of a triangle. The flange 220 has a mounting section 222 with holes 227 that traverse the separate plates 226. The holes 227 may be arranged close to the vertex regions of the triangle.

As shown in FIGS. 5B and 5C, the hollow body 210 has a cylindrical cross section shape with an increasing radius towards the axial end 215 from which the integrated flange 220 extends at a predetermined angle 229. If desired, the hollow body 210 may have a different cross section shape at the axial end 215. For example, the hollow body 210 may have a circular cross section shape that evolves into a polygonal cross section shape towards the axial end 215. If desired, the hollow body 210 may have a straight polygonal cross section shape over the complete length of the hollow body 210.

As an example, consider the scenario in which the polygonal cross section shape at the axial end 215 has a triangular cross section shape. In this scenario, the vertices of the triangular cross section shape of the hollow body 210 may be located towards the middle of the edges of the triangle that forms the flange 220.

Illustratively, the triangular cross section shape of the hollow body 210 may allow an easy fail-safe torque transfer from the hollow body 210 to the flange 220 and vice versa.

Moreover, the triangular cross section shape of the hollow body 210 at the end may allow a bending of the laminate to an almost perpendicular direction relative to the rotational axis.

As shown in FIGS. 5D and 5E, the flange 220 may extend perpendicular relative to the rotation axis 216. In other words, there may be an angle of approximately 90° between flange 220 and rotation axis 216. Since the radius of the hollow body 210 increases towards the axial end 215, the angle 229 between the hollow body 210 and the flange 220 may be greater than 90°.

Figure 6A:
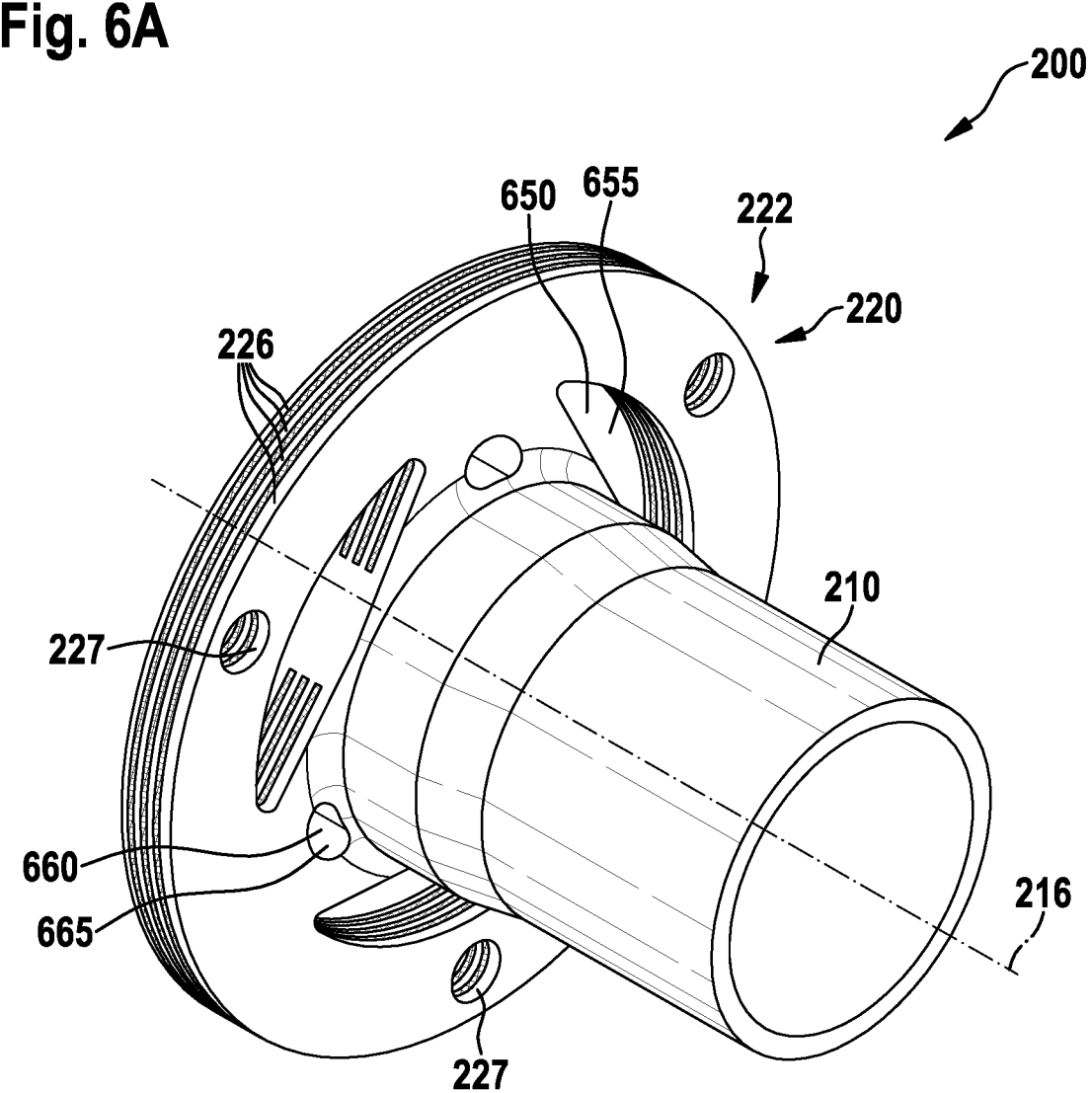
FIG. 6A is a three-dimensional diagram of an illustrative drive shaft with an integrated flange with cut-outs in accordance with some embodiments.
Figure 6B:
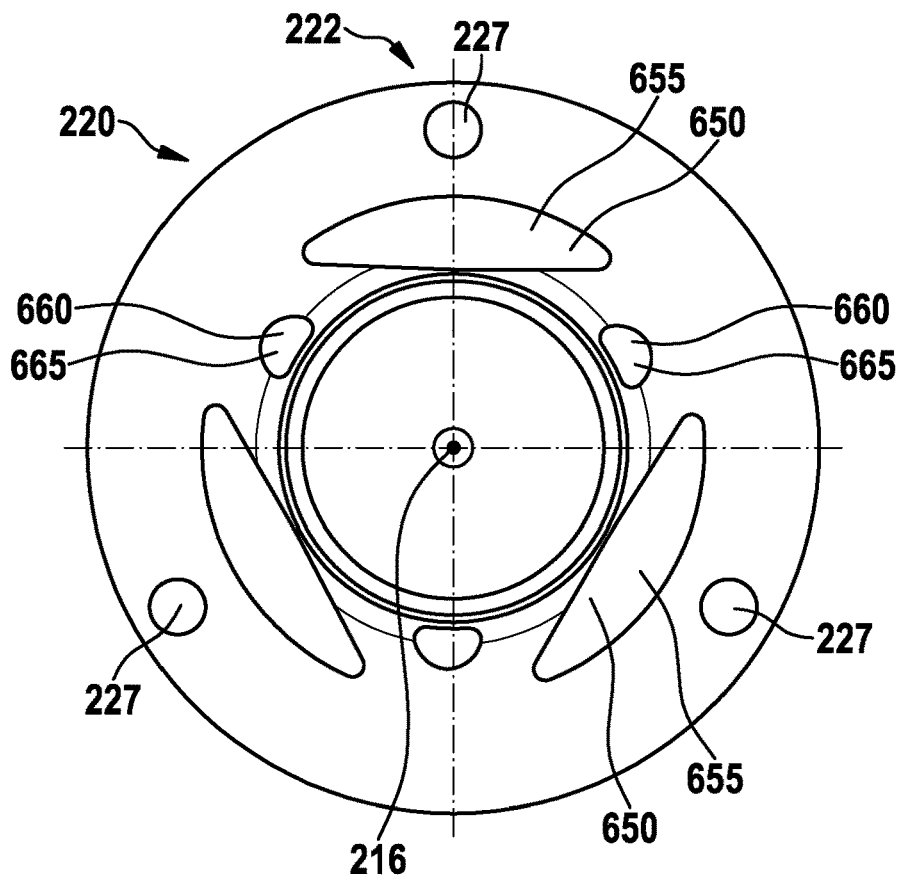
FIG. 6B is a diagram of the illustrative drive shaft of FIG. 6A seen in direction of the associated rotation axis in accordance with some embodiments.
Figure 6C:
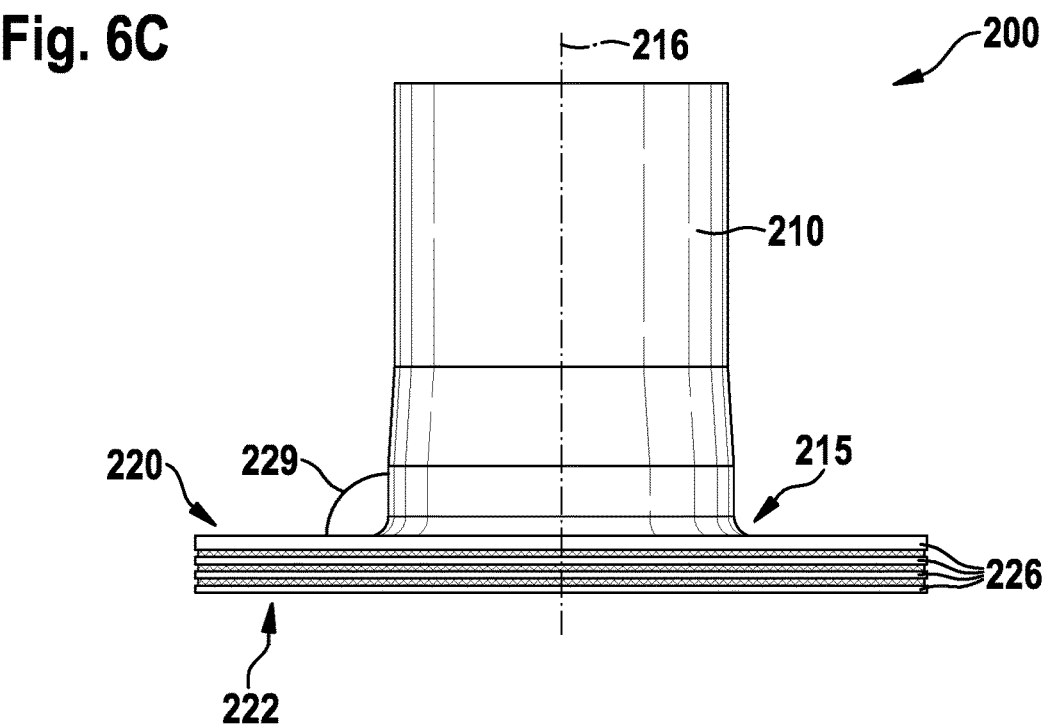
FIG. 6C is a diagram of the illustrative drive shaft of FIG. 6A seen in a direction that is perpendicular to the associated rotation axis in accordance with some embodiments.

FIG. 6A, FIG. 6B, and FIG. 6C describe a same drive shaft 200 for a drive system comprising a hollow body 210 and a flange 220 and are commonly described hereinafter. FIG. 6A is a three-dimensional diagram of the illustrative drive shaft 200 with an integrated flange 220 having cut-outs 650 and 660, FIG. 6B is a diagram of the illustrative drive shaft 200 of FIG. 6A seen in direction of the associated rotation axis 216, and FIG. 6C is a diagram of the illustrative drive shaft 200 of FIG. 6A seen in a direction that is perpendicular to the associated rotation axis 216 in accordance with some embodiments.

Flange 220 extends perpendicularly from the rotation axis 216 of drive shaft 200. Flange 220 comprises at least two separate plates 226 that branch out from the hollow body 210 at an axial end 215. As shown, flange 220 comprises four separate plates 226. However, flange 220 may comprise two, three or more than four separate plates 226, if desired.

The flange 220 and thereby the at least two separate plates 226 may have at least first and second cut-outs 650, 660. As shown in FIGS. 6A and 6B, the four separate plates 226 have three cut-outs 650 with cross section shape 655 and three cut-outs 660 with cross section shape 665. If desired, the four separate plates 226 may have more or less than three cut-outs 650 and/or more or less than three cut-outs 660.

As shown in FIGS. 6A and 6B, cut-outs 650 and 660 may be evenly distributed around the rotation axis 216 of hollow body 210. If desired, cut-outs 650 and/or cut-outs 660 may be un-evenly distributed around the rotation axis 216.

The at least first and second cut-outs 650, 660 may have different cross section shapes 655, 665. For example, the cut-outs 650, 660 may have different lengths and/or widths.

Illustratively, the cross section shapes 655 of cut-outs 650 and/or the cross section shapes 665 of cut-outs 660 may be symmetrical. As shown, each cut-out 650 and 660 may have reflectional symmetry. The three cut-outs 650 and the three cut-outs 660 are arranged with rotational symmetry around the rotation axis 216 on flange 220.

The arrangement and shapes of the cut-outs 650, 660 may be useful for different loads in both rotation directions. The shorter free length of the four separate plates 226, for example compared to the flange 220 of FIGS. 2A to 2C, may result in a higher buckling strength of the flange 220 of FIGS. 6A to 6C compared to the flange 220 shown in FIGS. 2A to 2C, considering that all other dimensions and materials are the same.

Figure 7A:
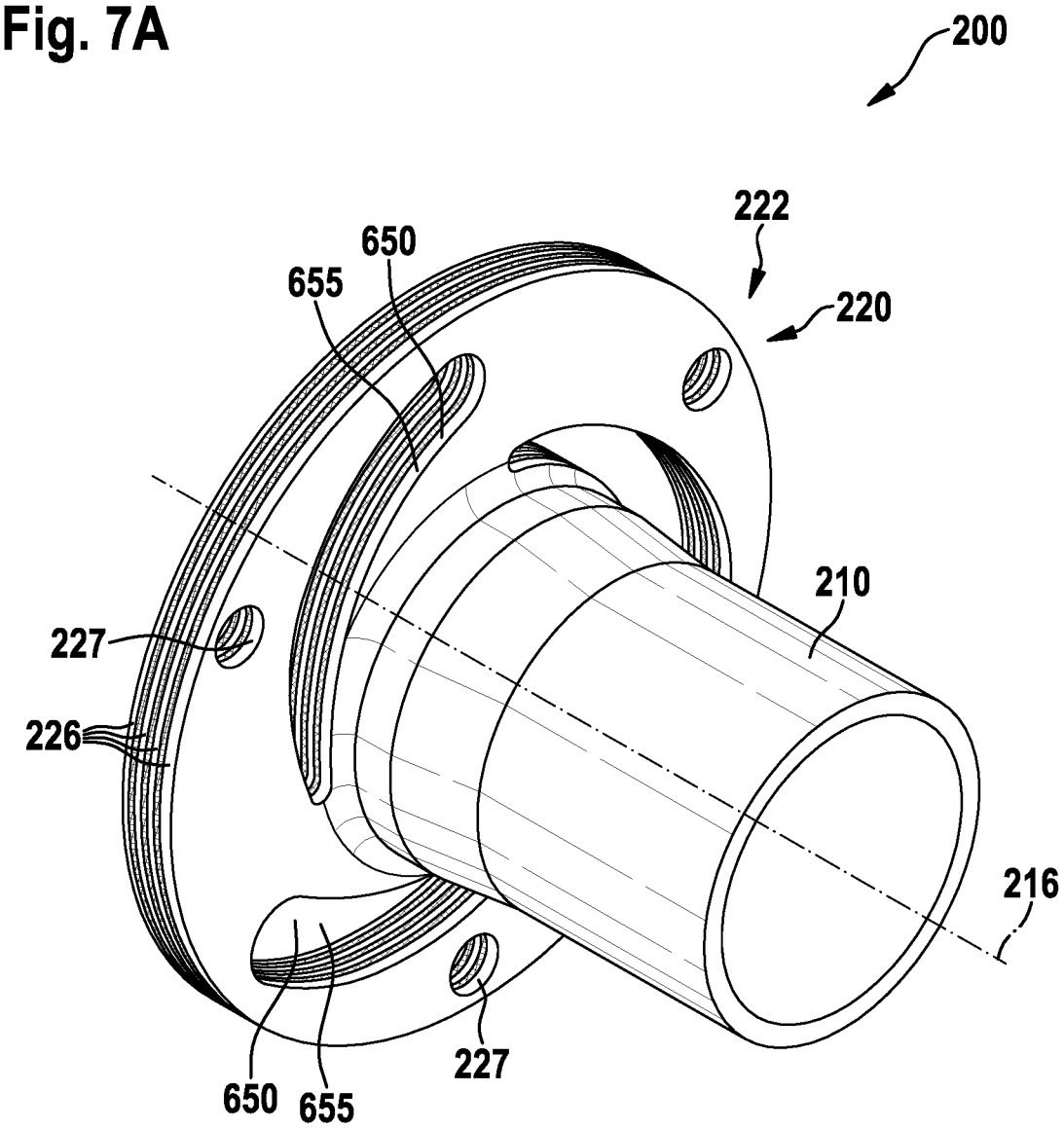
FIG. 7A is a three-dimensional diagram of an illustrative drive shaft with an integrated flange with asymmetrical cut-outs in accordance with some embodiments.
Figure 7B:
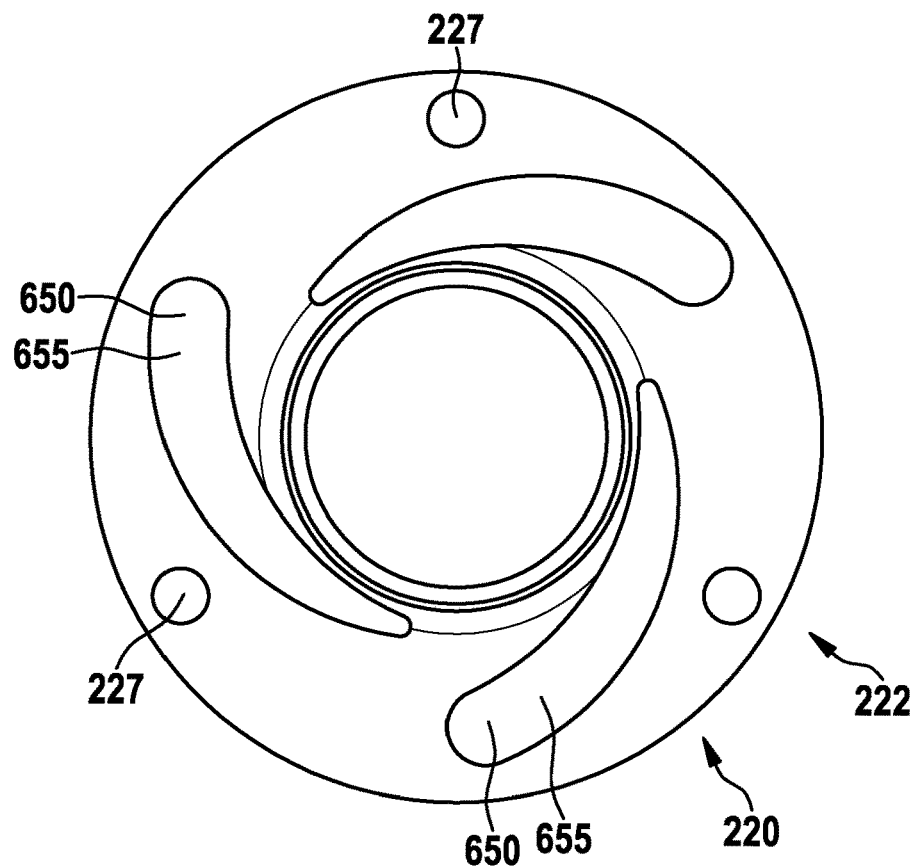
FIG. 7B is a diagram of the illustrative drive shaft of FIG. 7A seen in direction of the associated rotation axis in accordance with some embodiments.
Figure 7C:
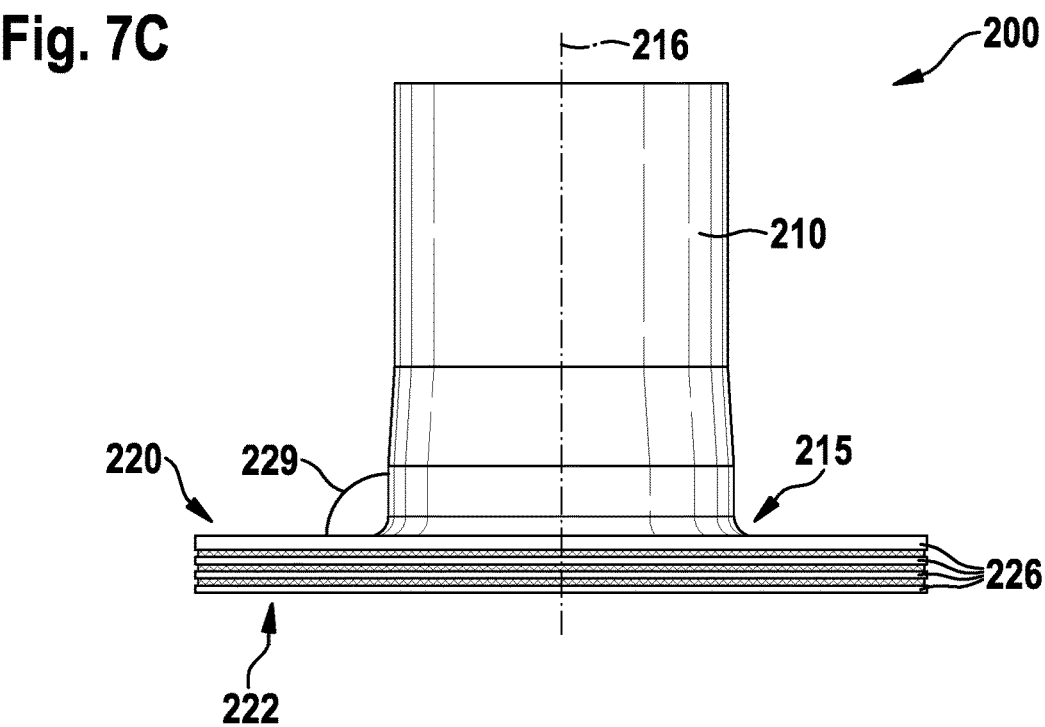
FIG. 7C is a diagram of the illustrative drive shaft of FIG. 7A seen in a direction that is perpendicular to the associated rotation axis in accordance with some embodiments.

FIG. 7A, FIG. 7B, and FIG. 7C describe a same drive shaft 200 for a drive system comprising a hollow body 210 and a flange 220 and are commonly described hereinafter. FIG. 7A is a three-dimensional diagram of the illustrative drive shaft 200 with an integrated flange 220 having cut-outs 650, FIG. 7B is a diagram of the illustrative drive shaft 200 of FIG. 7A seen in direction of the associated rotation axis 216, and FIG. 7C is a diagram of the illustrative drive shaft 200 of FIG. 7A seen in a direction that is perpendicular to the associated rotation axis 216 in accordance with some embodiments.

Flange 220 extends perpendicularly (i.e., at a predetermined angle 229 of 90°) from the rotation axis 216 of drive shaft 200. Flange 220 comprises at least two separate plates 226 that branch out from the hollow body 210 at an axial end 215. As shown, flange 220 comprises four separate plates 226. However, flange 220 may comprise two, three or more than four separate plates 226, if desired.

The flange 220 and thereby the at least two separate plates 226 may have at least first and second cut-outs 650. As shown in FIGS. 7A and 7B, the four separate plates 226 have three cut-outs 650 which all have the same cross section shape 655. If desired, the four separate plates 226 may have more or less than three cut-outs 650.

As shown in FIGS. 7A and 7B, cut-outs 650 may be evenly distributed around the rotation axis 216 of hollow body 210. If desired, cut-outs 650 may be un-evenly distributed around the rotation axis 216.

The at least first and second cut-outs 650 may have identical cross section shapes 655, whereby "identical" means that the at least first and second cut-outs 650 have the same cross section shape that differ from each other not more than by predetermined manufacturing tolerances. Illustratively, the cross section shapes 655 of cut-outs 650 may be asymmetrical. The three cut-outs 650 may be arranged with rotational symmetry around rotation axis 216 on flange 220.

Figure 8A:
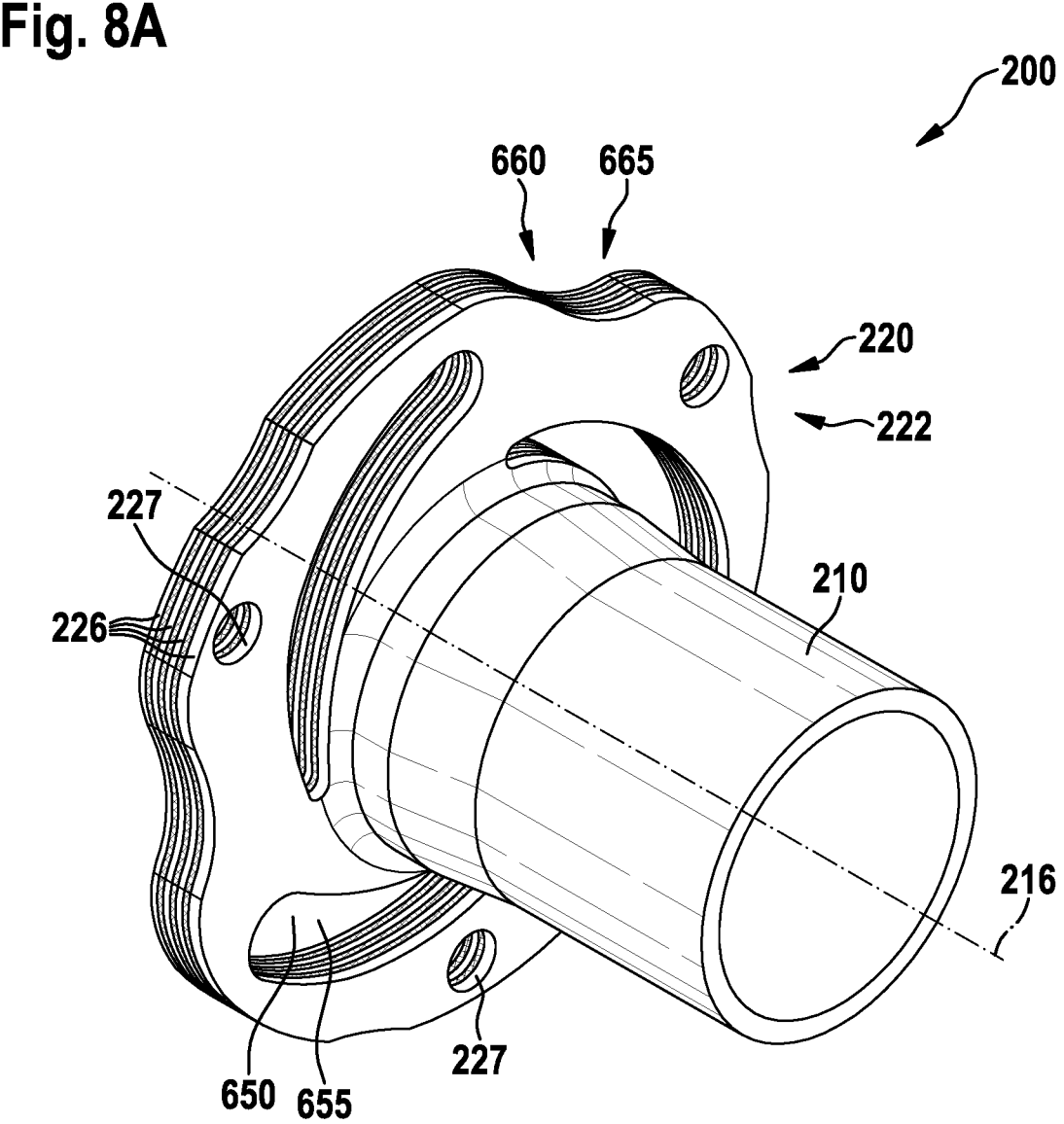
FIG. 8A is a three-dimensional diagram of an illustrative drive shaft with an integrated flange with cut-outs in the outer contour of the flange in accordance with some embodiments.

If desired, the flange 220 may have additional cut-outs. FIG. 8A is a three-dimensional diagram of an illustrative drive shaft 200 with an integrated flange 220 with additional cut-outs 660 in the outer contour of the flange 220 of FIGS. 7A to 7C, FIG. 8B is a diagram of the illustrative drive shaft 200 of FIG. 8A seen in direction of the associated rotation axis 216, and FIG. 8C is a diagram of the illustrative drive shaft 200 of FIG. 8A seen in a direction that is perpendicular to the associated rotation axis 216 in accordance with some embodiments.

The additional cut-outs 660 in the outer contour may further reduce the weight of the drive shaft 200 compared to the drive shaft 200 shown in FIGS. 7A to 7C. Moreover, due to the additional cut-outs 660 in the outer contour, flange 220 may have an increased flexibility in a direction parallel to the rotation axis 216 compared to the flange shown in FIGS. 7A to 7C.

Figure 8B:
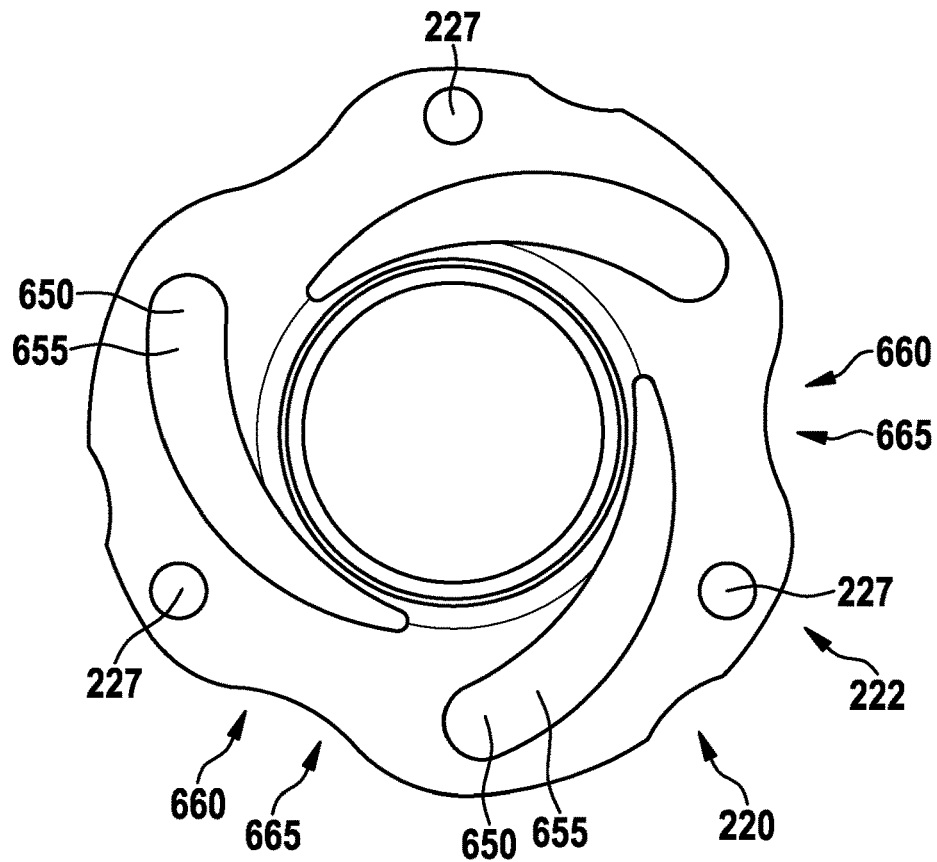
FIG. 8B is a diagram of the illustrative drive shaft of FIG. 8A seen in direction of the associated rotation axis in accordance with some embodiments.
Figure 8C:
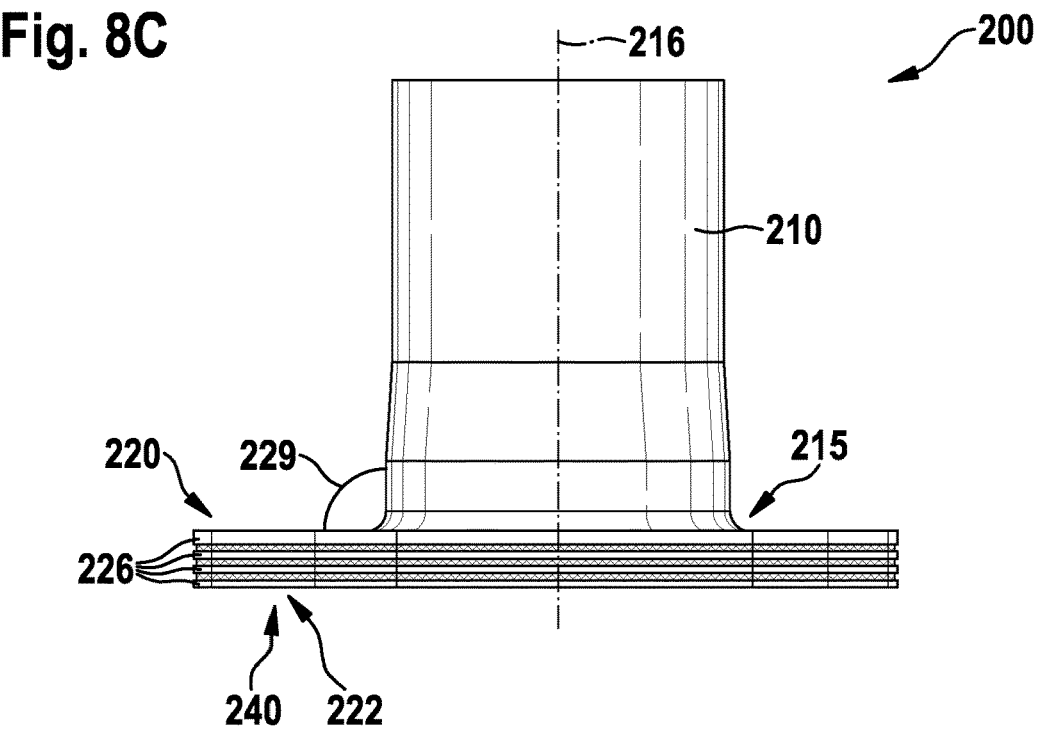
FIG. 8C is a diagram of the illustrative drive shaft of FIG. 8A seen in a direction that is perpendicular to the associated rotation axis in accordance with some embodiments.

As shown in FIG. 8B, the flange 220 includes two different cross section shapes 665 of cut-outs 660 of the outer contour in addition to the cut-outs 650 already shown in FIGS. 7A and 7B. If desired, the cut-outs 660 of the outer contour of the flange 220 may all have the same cross section shape 665. Alternatively, the cut-outs 660 of the outer contour of the flange 220 may have more than two different cross section shapes 665.

Each one of the two different cross section shapes 665 of the cut-outs 660 of the outer contour may be repeated. For example, each one of the two different cross section shapes 665 may be repeated once, twice, three times, four times, etc.

As shown in FIG. 8B, the cross section shapes 665 of the cut-outs 660 of the outer contour are symmetrical. If desired, at least some cut-out cross section shapes of the outer contour may be asymmetrical.

Figure 9A:
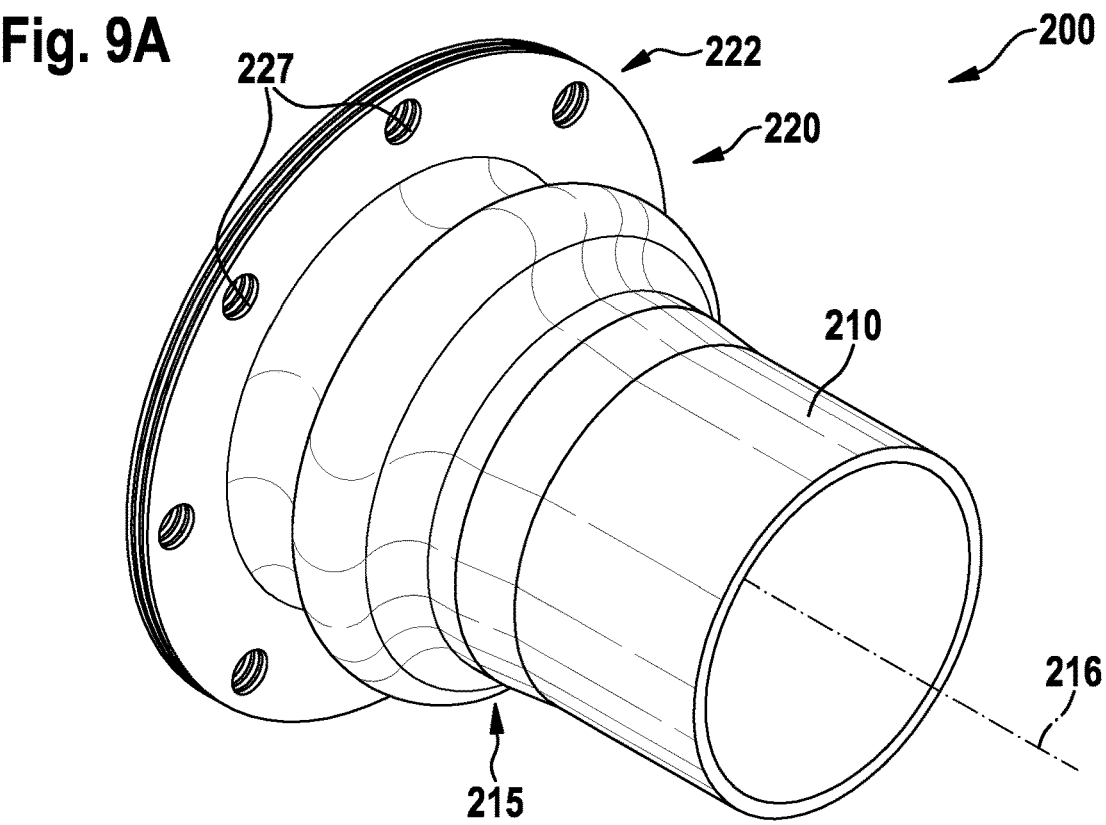
FIG. 9A is a three-dimensional diagram of an illustrative drive shaft with a hollow body and an integrated flange that forms a bulge in accordance with some embodiments.
Figure 9B:
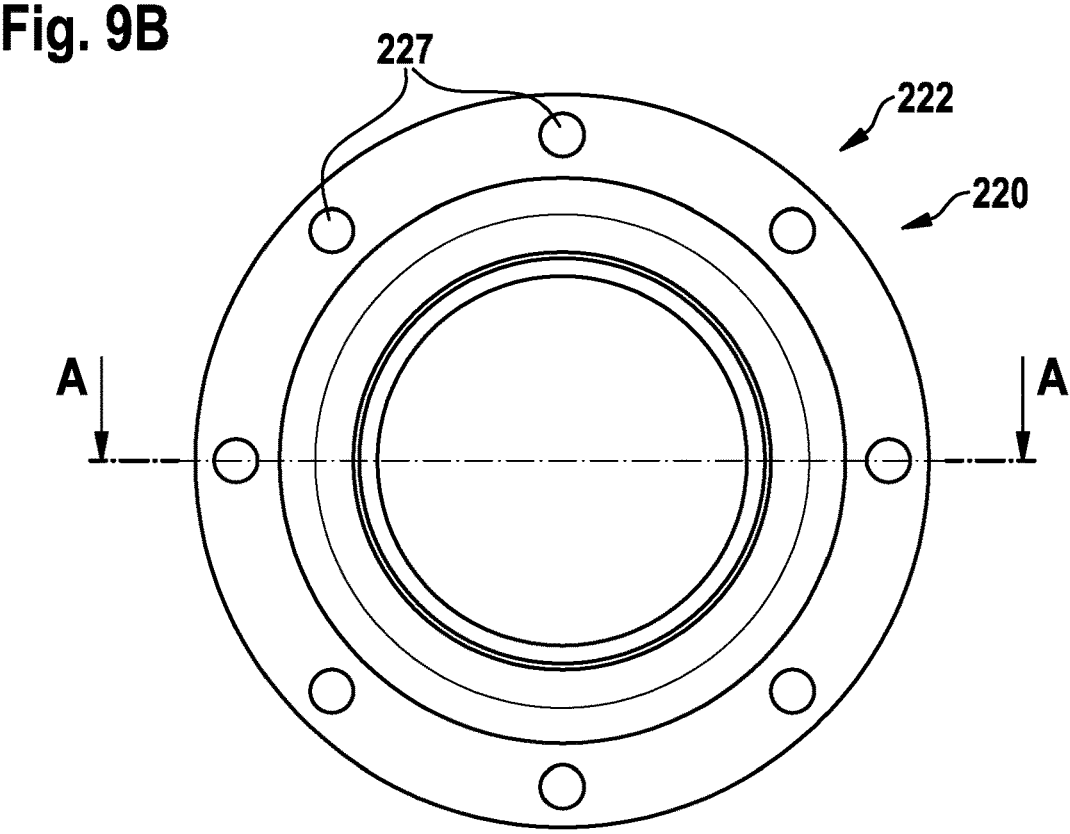
FIG. 9B is a diagram of the illustrative drive shaft of FIG. 9A seen in direction of the associated rotation axis in accordance with some embodiments.
Figure 9C:
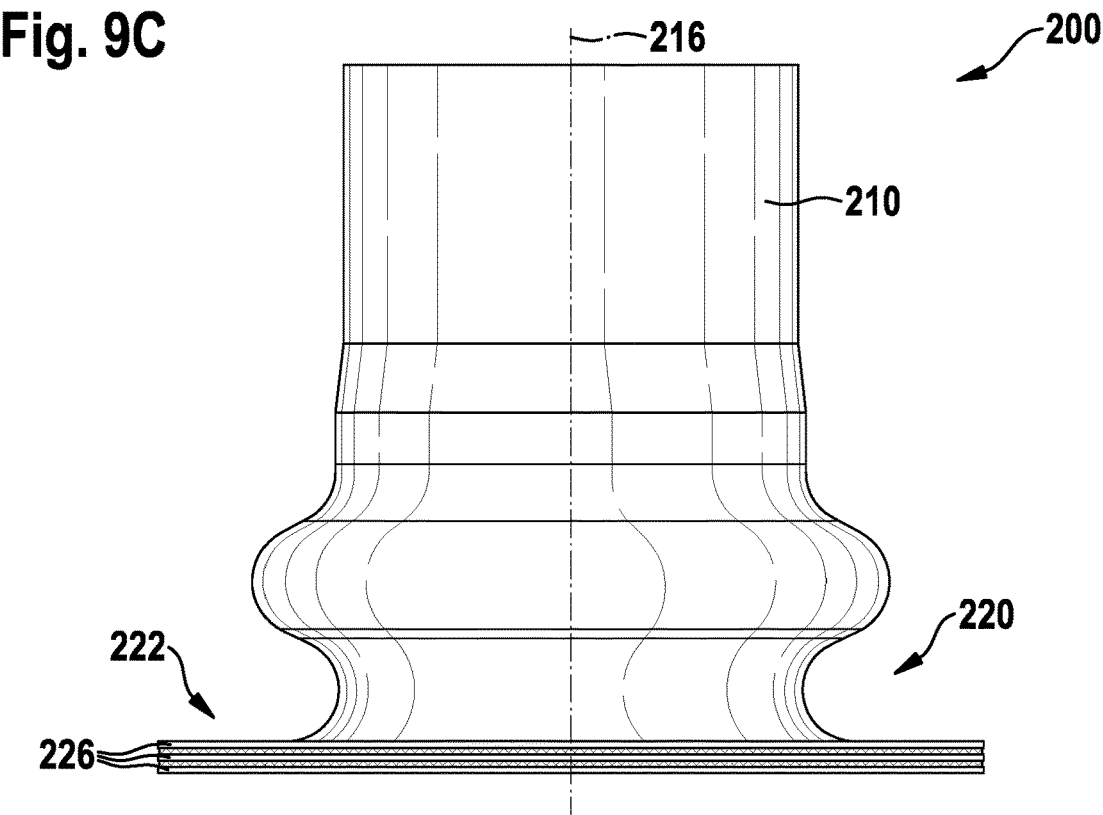
FIG. 9C is a diagram of the illustrative drive shaft of FIG. 9A seen in a direction that is perpendicular to the associated rotation axis in accordance with some embodiments.
Figure 9D:
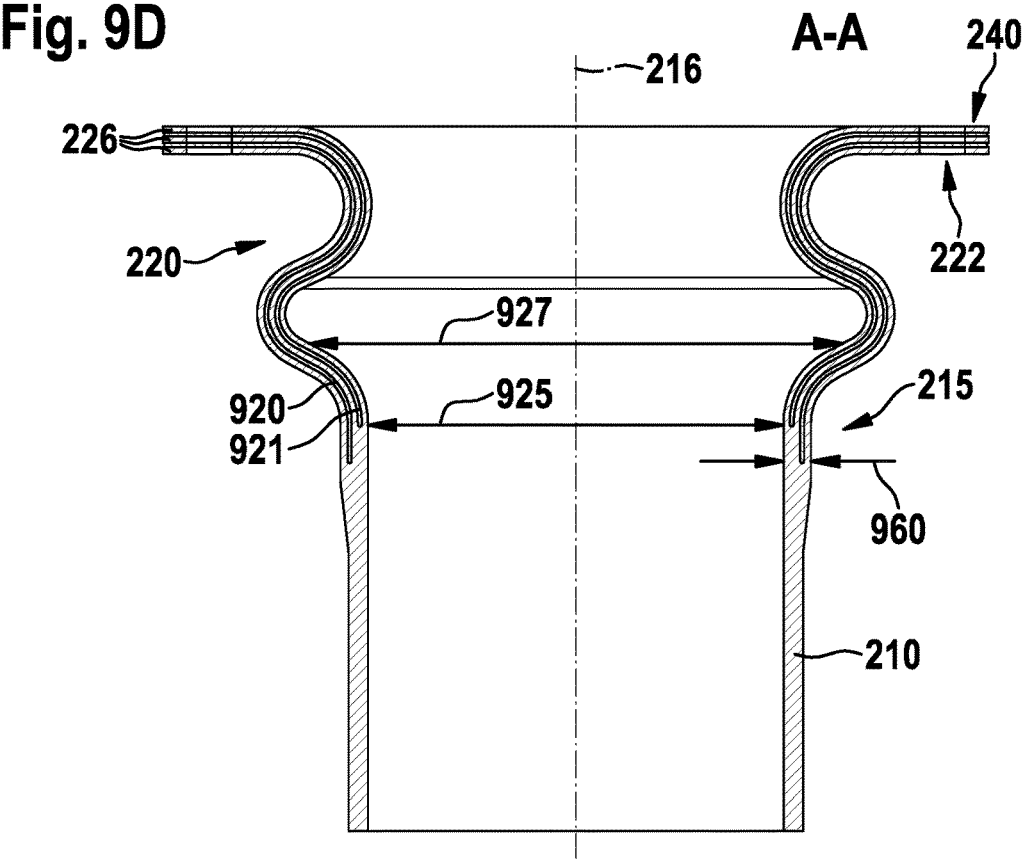
FIG. 9D is a diagram of an illustrative cross section of the drive shaft of FIG. 9A in accordance with some embodiments.

FIG. 9A, FIG. 9B, FIG. 9C, and FIG. 9D describe a same drive shaft 200 for a drive system comprising a hollow body 210 and a flange 220 and are commonly described hereinafter. FIG. 9A is a three-dimensional diagram of the illustrative drive shaft 200 with a hollow body 210 and an integrated flange 220 that forms a bulge, FIG. 9B is a diagram of the illustrative drive shaft 200 of FIG. 9A seen in direction of the associated rotation axis 216, FIG. 9C is a diagram of the illustrative drive shaft 200 of FIG. 9A seen in a direction that is perpendicular to the associated rotation axis 216, and FIG. 9D is a diagram of an illustrative cross section of the drive shaft 200 of FIG. 9A in accordance with some embodiments.

As shown in FIGS. 9A to 9D, drive shaft 200 comprises a hollow body 210. Hollow body 210 may have a circular cross section shape, a polygonal cross section shape, an oval cross section shape, or an elliptical cross section shape. If desired, hollow body 210 may have a circular cross section shape, a polygonal cross section shape, an oval cross section shape, and/or an elliptical cross section shape in at least some sections.

As shown in FIG. 9A, 9B, the hollow body 210 may have a circular cross section shape. As shown in FIG. 9D, the circular cross section shape may have a wall thickness 960 that increases towards the axial end 215. In other words, the hollow body 210 may have a wall thickness 960 at the axial end 215 that is greater than a mean wall thickness of the hollow body 210.

Drive shaft 200 further comprises a flange 220. Flange 220 is arranged at the axial end 215 of the hollow body 210. Flange 220 is integrally formed with the hollow body 210. For example, flange 220 may be formed together with the hollow body 210 during manufacturing of the drive shaft 200.

Flange 220 comprises at least two separate plates 226. Illustratively, flange 220 is shown to have three separate plates 226. However, flange 220 may have two, four, five, six, seven, or more separate plates 226, if desired.

The at least two separate plates 226 branch out from the hollow body 210 at the axial end 215. As shown in FIG. 9D, the at least two separate plates 226 branch out from the hollow body 210 in at least two concentric shells 920, 921 around the rotation axis 216 at the axial end 215.

The at least two concentric shells 920, 921 may have a first inner diameter 925 at a first distance from the axial end 215 and a second inner diameter 927 at a second distance from the axial end 215, whereby the first and second inner diameters 925, 927 are different.

As an example, the first inner diameter 925 may be smaller than the second inner diameter 927. Thus, the inner diameter of the at least two concentric shells 920, 921 may increase with an increasing distance from the axial end 215 of the hollow body 210 where the hollow body 210 branches out into the at least two separate plates 226.

As another example, the first inner diameter 925 may be greater than the second inner diameter 927. Thus, the inner diameter of the at least two concentric shells 920, 921 may decrease with an increasing distance from the axial end 215 of the hollow body 210 where the hollow body 210 branches out into the at least two separate plates 226.

As yet another example and as shown in FIG. 9D, the inner diameter 927 of the at least two concentric shells 920, 921 may increase and then decrease with an increasing distance from the axial end 215 of the hollow body 210, thereby forming a bulge.

If desired, the inner diameter 927 of the at least two concentric shells 920, 921 may decrease and then increase with an increasing distance from the axial end 215 of the hollow body 210, thereby forming an indentation.

Illustratively, the drive shaft 210 may include one or more bulges and/or one or more indentations. The one or more bulges and/or the one or more indentations may be arranged sequentially, if desired.

Flange 220 also comprises a mounting section 222 at a further distance from the axial end 215 (i.e., beyond the change in inner diameter of the at least two concentric shells 920, 921).

By way of example, the mounting section 222 may be arranged at least partially with a predetermined angle relative to the rotation axis 216. As shown in FIGS. 9C and 9D, the mounting section 222 is arranged at a 90° angle relative to the rotation axis 216.

The mounting section 222 is configured to be mounted to an external component and comprises a plurality of holes 227 that is adapted to accommodate coupling means.

At least one hole of the plurality of holes 227 traverses the at least two separate plates 226. As shown in FIGS. 9A, 9B, and 9D, all holes of the plurality of holes 227 traverse all plates of the at least two separate plates 226.

Figure 10A:
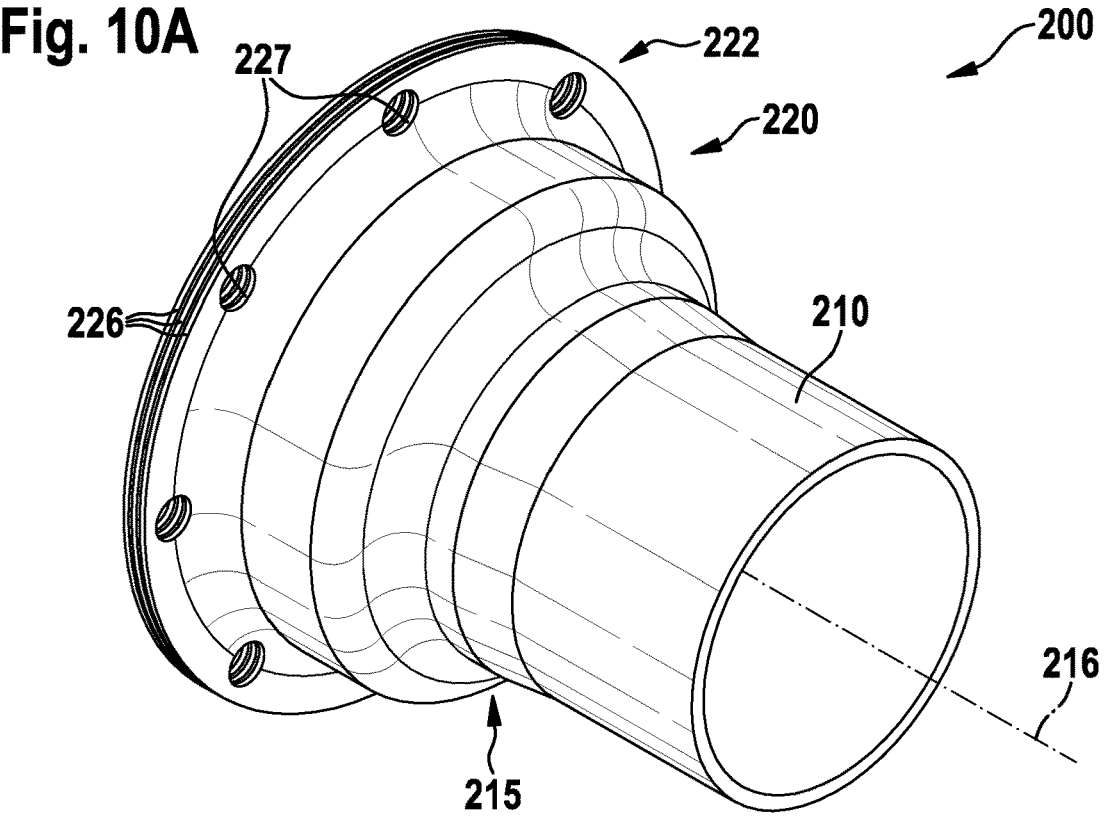
FIG. 10A is a three-dimensional diagram of an illustrative drive shaft with an integrated flange having an increasing diameter in accordance with some embodiments.
Figure 10B:
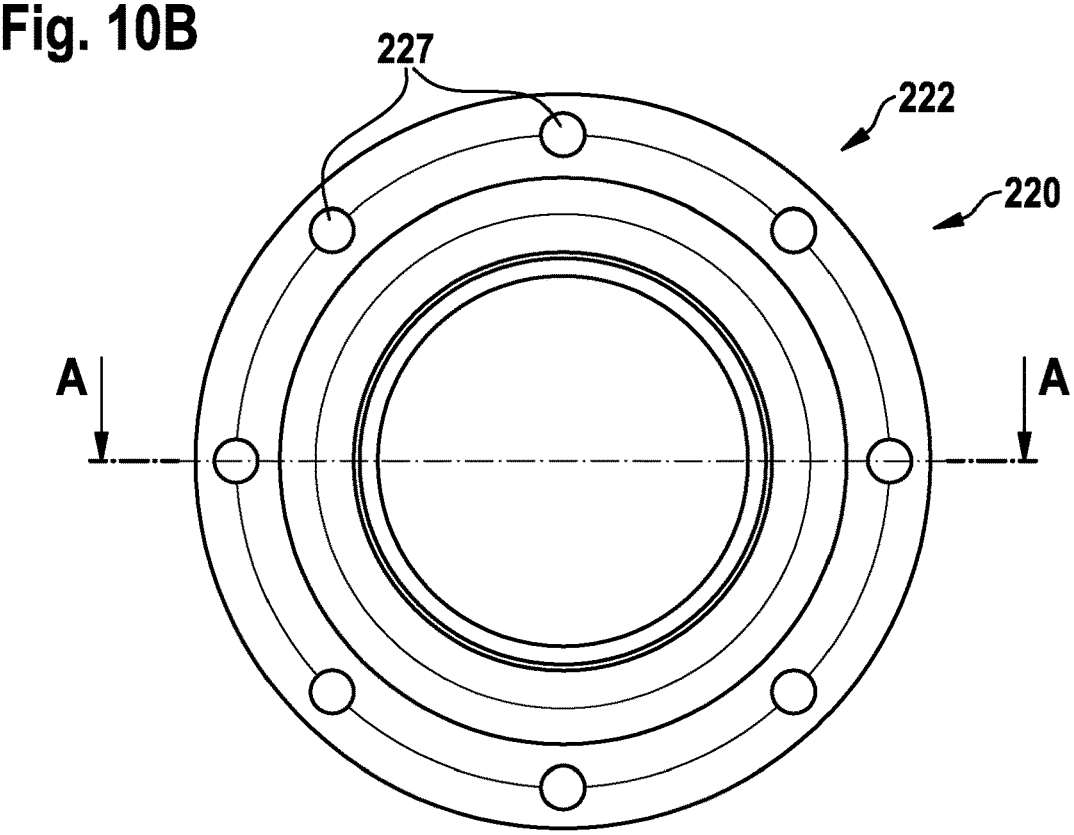
FIG. 10B is a diagram of the illustrative drive shaft of FIG. 10A seen in direction of the associated rotation axis in accordance with some embodiments.
Figure 10C:
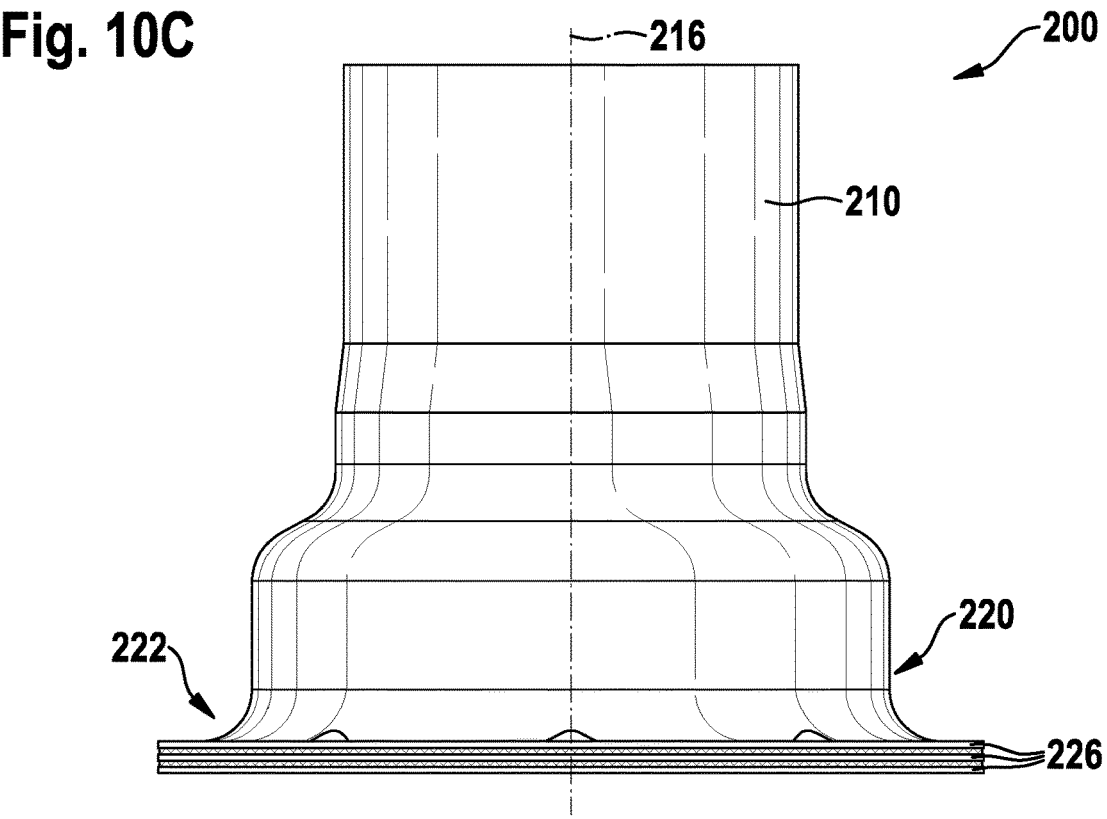
FIG. 10C is a diagram of the illustrative drive shaft of FIG. 10A seen in a direction that is perpendicular to the associated rotation axis in accordance with some embodiments.
Figure 10D:
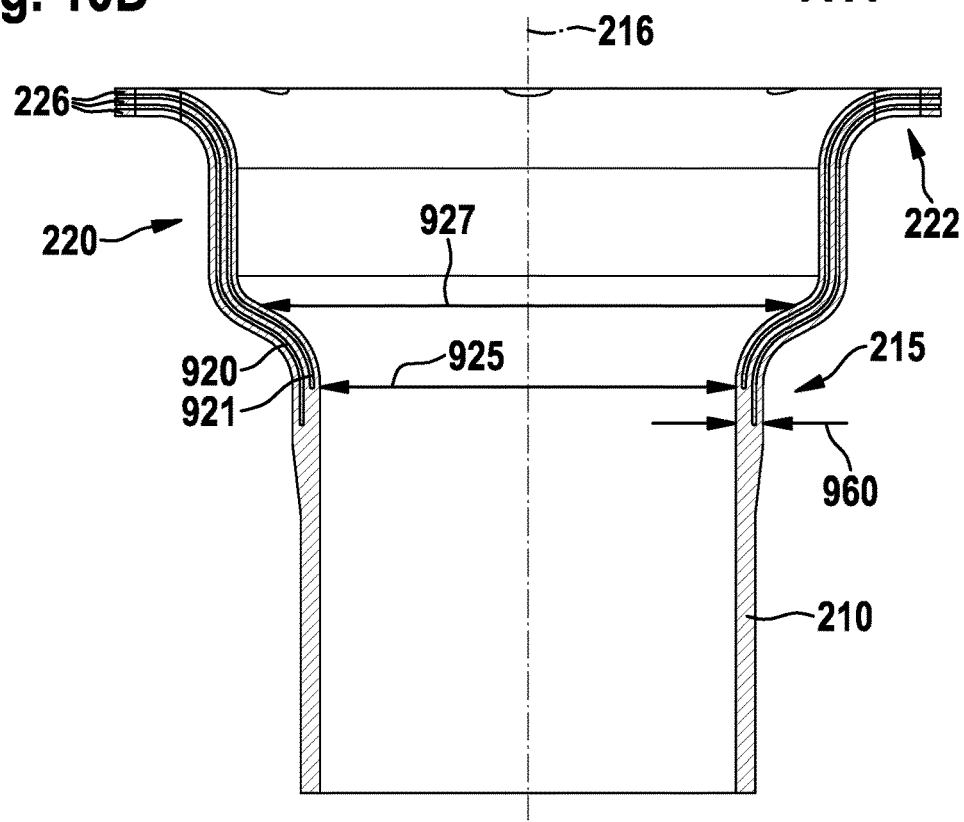
FIG. 10D is a diagram of an illustrative cross section of the drive shaft of FIG. 10A in accordance with some embodiments.

FIG. 10A, FIG. 10B, FIG. 10C, and FIG. 10D describe a same drive shaft 200 for a drive system comprising a hollow body 210 and a flange 220 and are commonly described hereinafter. FIG. 10A is a three-dimensional diagram of an illustrative drive shaft 200 with a hollow body 210 and an integrated flange 220 having an increasing diameter, FIG. 10B is a diagram of the illustrative drive shaft 200 of FIG. 10A seen in direction of the associated rotation axis 216, FIG. 10C is a diagram of the illustrative drive shaft 200 of FIG. 10A seen in a direction that is perpendicular to the associated rotation axis 216, and FIG. 10D is a diagram of an illustrative cross section of the drive shaft 200 of FIG. 10A in accordance with some embodiments.

As shown in FIGS. 10A to 10D, drive shaft 200 comprises a hollow body 210 and a flange 220. Flange 220 is arranged at the axial end 215 of the hollow body 210 and integrally formed with the hollow body 210. For example, flange 220 may be formed together with the hollow body 210 during manufacturing of the drive shaft 200.

Flange 220 comprises at least two separate plates 226. Illustratively, flange 220 is shown to have three separate plates 226. However, flange 220 may have two, four, five, six, seven, or more separate plates 226, if desired.

The at least two separate plates 226 branch out from the hollow body 210 at the axial end 215. As shown in FIG. 9D, the at least two separate plates 226 branch out from the hollow body 210 in at least two concentric shells 920, 921 around the rotation axis 216 at the axial end 215.

The at least two concentric shells 920, 921 may have a first inner diameter 925 at a first distance from the axial end 215 and a second inner diameter 927 at a second distance from the axial end 215, whereby the first and second inner diameters 925, 927 are different.

As shown in FIG. 10D, the first inner diameter 925 may be smaller than the second inner diameter 927. Thus, the inner diameter of the at least two concentric shells 920, 921 may increase with an increasing distance from the axial end 215 of the hollow body 210 where the hollow body 210 branches out into the at least two separate plates 226.

If desired, the inner diameter may remain constant with a further increasing distance from the axial end 215 after a predetermined increase from the first to the second inner diameter 925, 927 has been achieved.

A drive shaft 200 with an outward step as shown in FIGS. 10A to 10D may be comparatively easy to manufacture. Illustratively, such a drive shaft 200 may be deformed without additional lay-in parts for the mold, which have to be divided before being deformed again. Moreover, no remaining or loosen parts are required for such a contour.

Figure 11A:
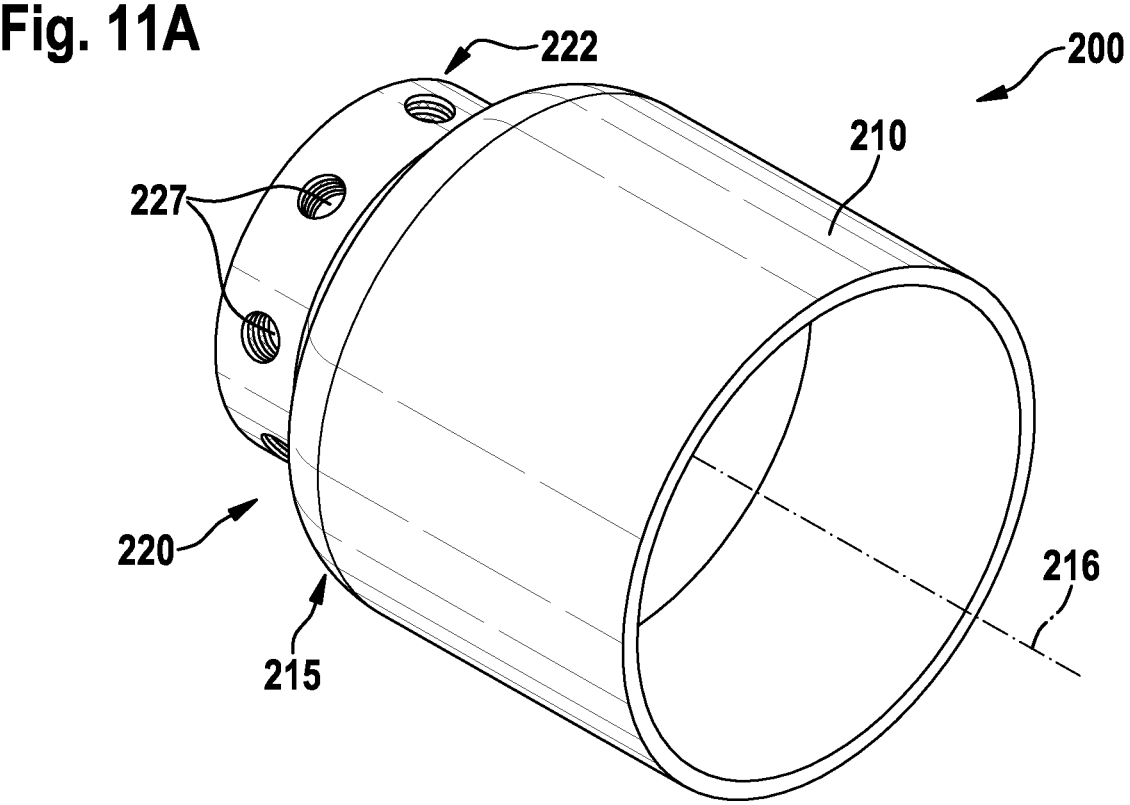
FIG. 11A is a three-dimensional diagram of an illustrative drive shaft with an integrated flange having a decreasing diameter in accordance with some embodiments.
Figure 11B:
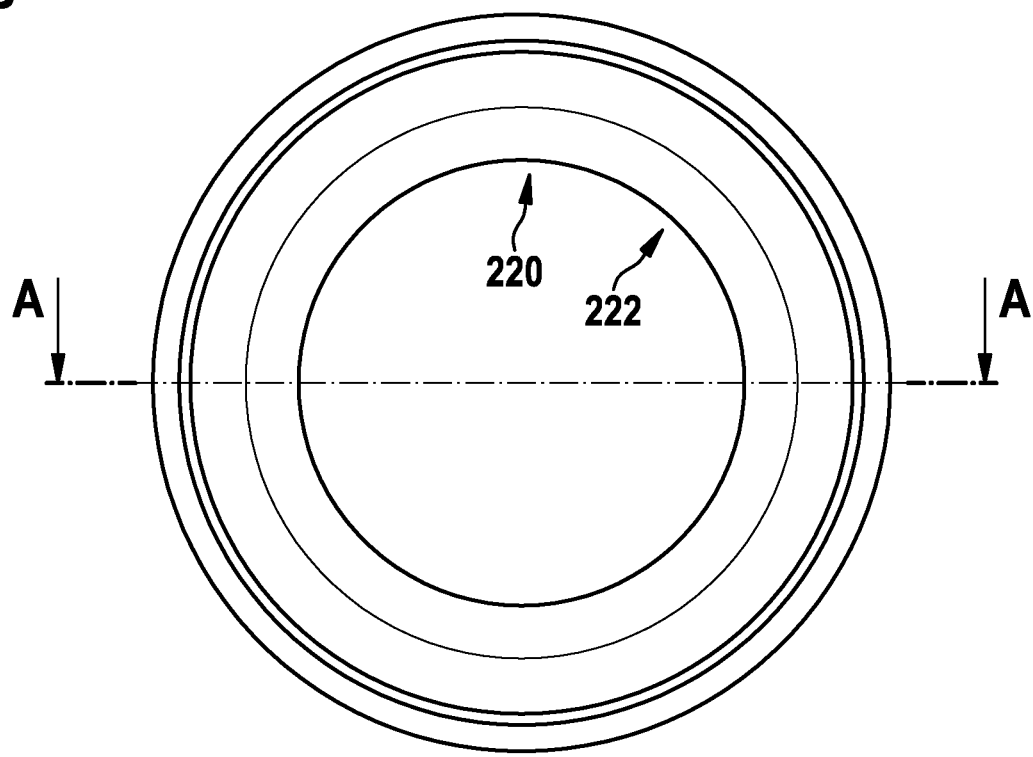
FIG. 11B is a diagram of the illustrative drive shaft of FIG. 11A seen in direction of the associated rotation axis in accordance with some embodiments.
Figure 11C:
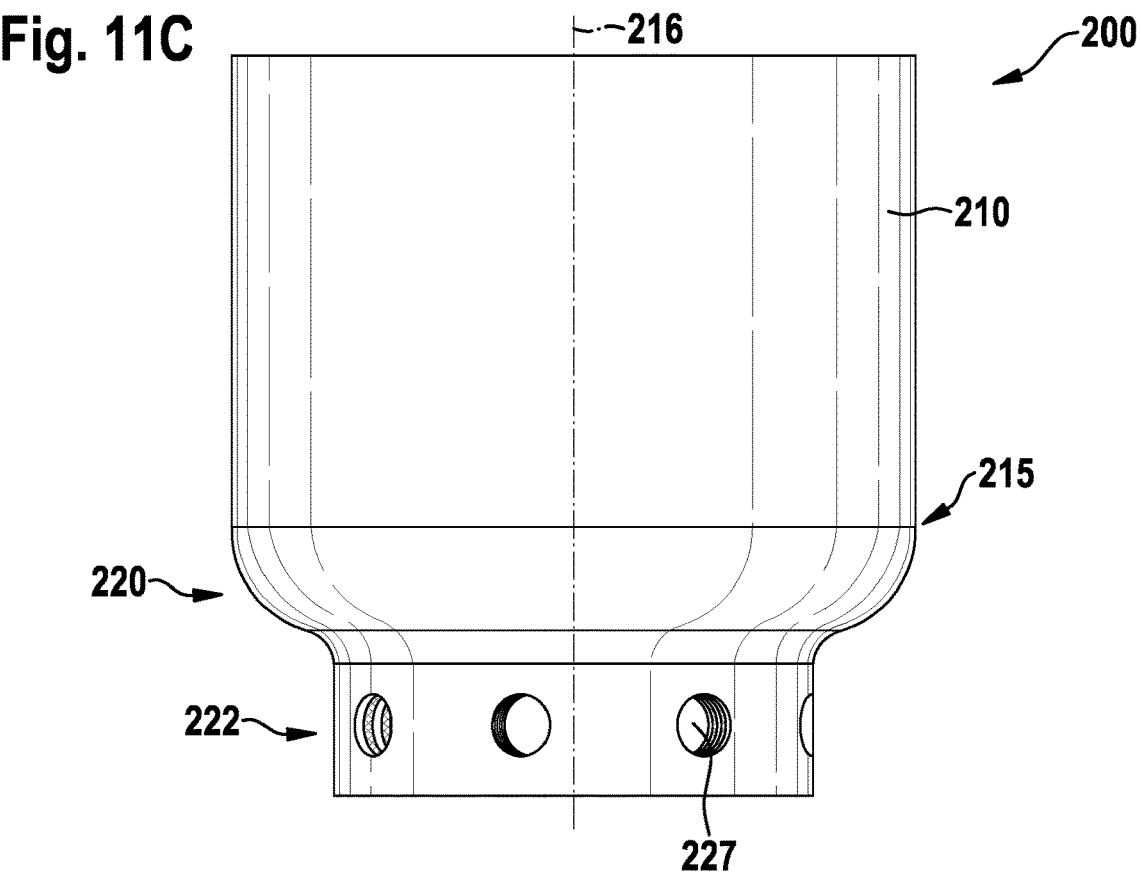
FIG. 11C is a diagram of the illustrative drive shaft of FIG. 11A seen in a direction that is perpendicular to the associated rotation axis in accordance with some embodiments.
Figure 11D:
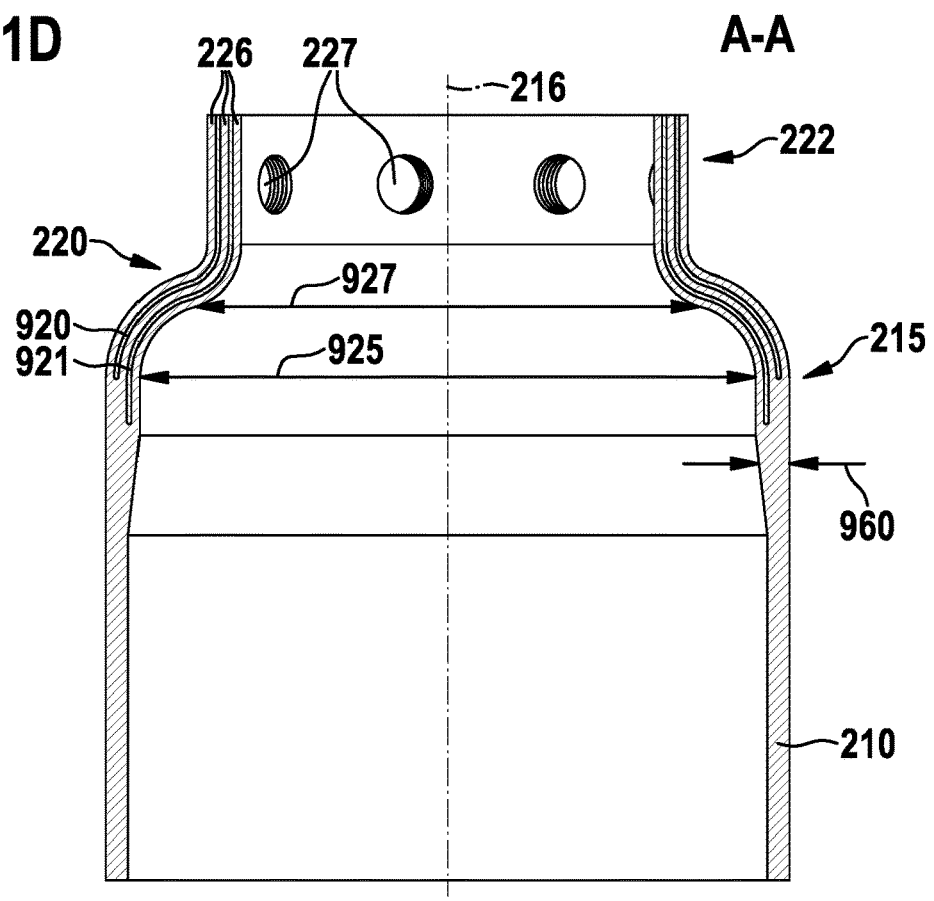
FIG. 11D is a diagram of an illustrative cross section of the drive shaft of FIG. 11A in accordance with some embodiments.

FIG. 11A, FIG. 11B, FIG. 11C, and FIG. 11D describe a same drive shaft 200 for a drive system comprising a hollow body 210 and a flange 220 and are commonly described hereinafter. FIG. 11A is a three-dimensional diagram of an illustrative drive shaft 200 with a hollow body 210 and an integrated flange 220 having a decreasing diameter, FIG. 11B is a diagram of the illustrative drive shaft 200 of FIG. 11A seen in direction of the associated rotation axis 216, FIG. 11C is a diagram of the illustrative drive shaft 200 of FIG. 11A seen in a direction that is perpendicular to the associated rotation axis 216, and FIG. 11D is a diagram of an illustrative cross section of the drive shaft 200 of FIG. 11A in accordance with some embodiments.

Compared to the drive shaft 200 of FIGS. 10A to 10D, which has an outward step, the drive shaft of FIGS. 11A to 11D has an inward step. In other words, the at least two separate plates 226 branch out from the hollow body 210 in at least two concentric shells 920, 921 around the rotation axis 216 at the axial end 215, whereby the at least two concentric shells 920, 921 have a first inner diameter 925 at a first distance from the axial end 215 and a second inner diameter 927 at a second distance from the axial end 215, and whereby the first inner diameter 925 is greater than the second inner diameter 927. Thus, the inner diameter of the at least two concentric shells 920, 921 may decrease with an increasing distance from the axial end 215 of the hollow body 210 where the hollow body 210 branches out into the at least two separate plates 226.

If desired, the inner diameter may remain constant with a further increasing distance from the axial end 215 after a predetermined decrease from the first to the second inner diameter 925, 927 has been achieved.

Flange 220 also comprises a mounting section 222 at a further distance from the axial end 215 (i.e., beyond the change in inner diameter of the at least two concentric shells 920, 921).

By way of example, the mounting section 222 may be configured to be mounted to an external component and comprises a plurality of holes 227 that is adapted to accommodate coupling means.

At least one hole of the plurality of holes 227 traverses the at least two separate plates 226. As shown in FIGS. 11A, 11C, and 11D, all holes of the plurality of holes 227 traverse all plates of the at least two separate plates 226.

Illustratively, the plurality of holes 227 may traverse the at least two separate plates 226 in a direction that is perpendicular to the rotating axis 216. Arranging the plurality of holes 227 in a direction that is perpendicular to the rotation axis 216 may be advantageous when directly connecting drive shaft 200 to another drive shaft.

Illustratively, drive shaft 200 may be connected to another drive shaft when bearings are required to build a long drive shaft (e.g., to avoid resonance). Examples for such long drive shafts are drive shafts that transmit torque to a tail rotor of a helicopter (e.g., to tail rotor 145 of helicopter 100 of FIG. 1). Such long drive shafts are typically interrupted by bearings which support the tail rotor drive shaft after a certain distance.

It should be noted that the above-described embodiments are merely described for illustration purposes, but not in order to restrict the present disclosure thereto. Instead, multiple modifications and variations of the presented embodiments are possible and should, therefore, also be considered as being part of the disclosure.

For example, drive shaft 200 of FIGS. 3A and 3B is shown with eight plate assemblies that each include four separate plates 226, while drive shaft 200 of FIGS. 4A and 4B is shown with six plate assemblies that each include four separate plates 226. However, drive shaft 200 of FIG. 3A to 4B may have any number of plate assemblies 320, 330 as long as the mounting section 222 allows for the mounting of the drive shaft 200 to an external component and as long as a plurality of holes 227 can provide for the accommodation of coupling means. Furthermore, the drive shaft 200 of FIGS. 3A to 4B may have any number of separate plates 226. For example, the number of separate plates 226 may be tailored towards a desired flexibility in direction of the rotation axis 216 and/or to a desired stress and load resistance.

As another example, the drive shaft 200 of FIGS. 5A and 4B is shown with a triangular flange 220. However, the flange 220 may have any polygonal shape, if desired. For example, flange 220 may have the shape of a rectangle, a pentagon, a hexagon, a heptagon, an octagon, etc.

REFERENCE LIST 100 rotary-wing aircraft, rotorcraft, helicopter
110 multi-blade rotor
112, 113 rotor blades
114 rotor head
115 rotor shaft
117 rotor axis
119 rotor plane
120 fuselage
123 cabin
127 rear fuselage
130 tail boom
135 horizontal stabilizer
140 counter-torque device
145 tail rotor
150 fin
200 drive shaft
210 hollow body
214 composite material
215 axial end
216 rotation axis
220 flange
222 mounting section
224 composite material
226 separate plates
227 holes
229 angle
240 reinforcement
320 first plate assembly
325 first direction
330 second plate assembly
335 second direction
650 cut-out
655 cross section shape
660 cut-out
665 cross section shape
920, 921 concentric shells
925, 927 inner diameter
960 wall thickness

What is claimed is:

1. A drive shaft, comprising:
   a hollow body with an associated rotation axis, wherein the hollow body is adapted to rotating around the rotation axis and is made of a first composite material; and
   a flange that is made of a second composite material and arranged at an axial end of the hollow body, wherein the flange is integrally formed with the hollow body and comprises:
   at least two separate plates that branch out from the hollow body at the axial end and extend at least partially with a predetermined angle relative to the rotation axis, wherein the at least two separate plates form at least a first and a second plate assembly, wherein the first plate assembly branches out from the hollow body in a first direction that is perpendicular to the rotation axis, and wherein the second plate assembly branches out from the hollow body in a second direction that is perpendicular to the rotation axis and different than the first direction, and
   a mounting section that is configured to be mounted to an external component and comprises a plurality of holes that is adapted to accommodate coupling means, wherein at least one hole of the plurality of holes traverses the at least two separate plates.

2. The drive shaft of claim 1 wherein the first and second composite materials are identical.

3. The drive shaft of claim 1 wherein the second composite material comprises at least one of carbon fiber, aramid fiber, basalt fiber, mineral fiber, or glass fiber.

4. The drive shaft of claim 1 wherein at least one of the at least two separate plates comprises a reinforcement around the at least one hole of the plurality of holes.

5. The drive shaft of claim 1 wherein the hollow body has a wall thickness at the axial end that is greater than a mean wall thickness of the hollow body.

6. A rotary-wing aircraft with a drive shaft, wherein the drive shaft comprises:
   a hollow body with an associated rotation axis, wherein the hollow body is adapted to rotating around the rotation axis and is made of a first composite material; and
   a flange that is made of a second composite material and arranged at an axial end of the hollow body, wherein the flange is integrally formed with the hollow body and comprises:
   at least two separate plates that branch out from the hollow body at the axial end and extend at least partially with a predetermined angle relative to the rotation axis, wherein the at least two separate plates form at least a first and a second plate assembly, wherein the first plate assembly branches out from the hollow body in a first direction that is perpendicular to the rotation axis, and wherein the second plate assembly branches out from the hollow body in a second direction that is perpendicular to the rotation axis and different than the first direction, and
   a mounting section that is configured to be mounted to an external component and comprises a plurality of holes that is adapted to accommodate coupling means, wherein at least one hole of the plurality of holes traverses the at least two separate plates.

7. The drive shaft of claim 1, wherein the hollow body comprises a wall thickness that is smaller than a sum of all thicknesses of the at least two separate plates.

8. The drive shaft of claim 1, wherein the hollow body comprises a wall thickness that is greater than a thickness of each one of the at least two separate plates.

9. The drive shaft of claim 1, wherein the at least two plates form six plate assemblies.

10. The drive shaft of claim 1, wherein the hollow body comprises a circular cross section shape.

11. A drive shaft, comprising:
a hollow body with an associated rotation axis, wherein the hollow body is adapted to rotating around the rotation axis and is made of a first composite material; and
a flange that is made of a second composite material and arranged at an axial end of the hollow body, wherein the first and second composite materials are different, and wherein the flange is integrally formed with the hollow body and comprises:
at least two separate plates that branch out from the hollow body at the axial end and extend at least partially with a predetermined angle relative to the rotation axis, wherein the at least two separate plates form at least a first and a second plate assembly, wherein the first plate assembly branches out from the hollow body in a first direction that is perpendicular to the rotation axis, and wherein the second plate assembly branches out from the hollow body in a second direction that is perpendicular to the rotation axis and different than the first direction, and
a mounting section that is configured to be mounted to an external component and comprises a plurality of holes that is adapted to accommodate coupling means, wherein at least one hole of the plurality of holes traverses the at least two separate plates.

12. The drive shaft of claim 11, wherein the second composite material comprises at least one of carbon fiber, aramid fiber, basalt fiber, mineral fiber, or glass fiber.

13. The drive shaft of claim 11, wherein at least one of the at least two separate plates comprises a reinforcement around the at least one hole of the plurality of holes.

14. The drive shaft of claim 11, wherein the hollow body has a wall thickness at the axial end that is greater than a mean wall thickness of the hollow body.

15. The drive shaft of claim 11, wherein the hollow body comprises a wall thickness that is smaller than a sum of all thicknesses of the at least two separate plates.

16. The drive shaft of claim 11, wherein the hollow body comprises a wall thickness that is greater than a thickness of each one of the at least two separate plates.

17. The drive shaft of claim 11, wherein the at least two plates form six plate assemblies.

18. The drive shaft of claim 11, wherein the hollow body comprises a circular cross section shape.

* * * * *